US007317833B2

(12) United States Patent
Kaneda

(10) Patent No.: US 7,317,833 B2
(45) Date of Patent: Jan. 8, 2008

(54) IMAGE PROCESSING APPARATUS AND IMAGE PROCESSING METHOD

(75) Inventor: Kitahiro Kaneda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 649 days.

(21) Appl. No.: 10/990,458

(22) Filed: Nov. 18, 2004

(65) Prior Publication Data

US 2005/0140679 A1 Jun. 30, 2005

(30) Foreign Application Priority Data

Nov. 20, 2003 (JP) ............................. 2003-390748

(51) Int. Cl.
  *G06K 9/00* (2006.01)
  *G06K 9/34* (2006.01)
  *G06T 11/20* (2006.01)
(52) U.S. Cl. ...................... 382/176; 382/187; 345/441
(58) Field of Classification Search ................ 382/162, 382/164, 173, 181, 185, 187, 190, 197, 198, 382/203, 218, 219, 284; 358/474, 537; 345/441, 345/467, 472.1, 600–604
See application file for complete search history.

(56) References Cited

U.S. PATENT DOCUMENTS

| 5,450,096 | A | * | 9/1995 | Yoshida et al. | .......... 345/472.1 |
| 6,137,905 | A | * | 10/2000 | Takaoka | ...................... 382/173 |
| 7,215,815 | B2 | * | 5/2007 | Honda | ......................... 382/187 |
| 7,236,174 | B2 | * | 6/2007 | Stamm et al. | .............. 345/467 |
| 2004/0162826 | A1 | * | 8/2004 | Wyschogrod et al. | .......... 707/6 |
| 2005/0140679 | A1 | * | 6/2005 | Kaneda | ...................... 345/441 |

FOREIGN PATENT DOCUMENTS

JP 5-12402 1/1993

* cited by examiner

*Primary Examiner*—Amir Alavi
(74) *Attorney, Agent, or Firm*—Fitzpatrick, Cella, Harper & Scinto

(57) ABSTRACT

There are provided an image processing apparatus and image processing method which can increase the processing efficiency upon obtaining data which allows re-use and re-editing of a document such as a paper document. While image data is input, and pieces of character information included in the input image data are sequentially recognized, the pieces of character information included in the input image data are subjected to outline conversion using vector data. At this time, the character type of the pieces of recognized character information and the vector data having undergone outline conversion are managed while being associated with each other. Upon recognizing the pieces of character information, it is determined whether the character type of the pieces of character information has undergone previous outline conversion. If it is determined that the character type has undergone the previous outline conversion, the management is controlled so as to use vector data used in the previous outline conversion.

9 Claims, 21 Drawing Sheets

FIG. 6

BLOCK INFORMATION

| | PROPERTY | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

PROPERTY  1 : text  2 : picture  3 : table  4 : line  5 : photo

INPUT FILE INFORMATION

| TOTAL NUMBER OF BLOCKS | N(=6) |
|---|---|

IMAGE PROCESSING APPARATUS AND IMAGE PROCESSING METHOD

FIELD OF THE INVENTION

The present invention relates to an image processing apparatus and image processing method, which convert an image scanned by an image processing apparatus such as a copying machine or the like into vector data that can be re-used by existing document creation application software.

BACKGROUND OF THE INVENTION

In recent years, amid increased attention to environmental issues, move to paperless offices has rapidly been promoted. For this reason, there has conventionally been built a document management system which scans paper documents accumulated and stored in binders and the like with a scanner or the like, converts them into portable document format (to be abbreviated as "PDF" hereinafter) files, and stores them in an image storage device (database).

There is known a document management system which recognizes character information included in image data obtained by scanning a document and associates it with font data (see, e.g., patent reference 1: Japanese Patent Laid-Open No. 5-12402). This arrangement facilitates re-use and re-editing of a paper document and the like.

However, in patent reference 1, character information obtained by character recognition is associated with font data prepared in advance and is not completely faithful to character information described in a document.

To cope with this, there can be considered a technique of extracting the outline of character information included in scanned image data and obtaining outline data. However, outline conversion requires a complicated process, and the processing time and load may increase in executing outline conversion for a large number of characters.

SUMMARY OF THE INVENTION

The present invention has been proposed to solve the conventional problems, and has as its objects to provide an image processing apparatus and image processing method, which can increase the processing efficiency in obtaining data which allows re-use or re-editing of a document such as a paper document.

In order to solve the problems, according to the present invention, there is provided an image processing apparatus comprising input means for inputting image data, character recognition means for sequentially recognizing pieces of character information included in the image data input by the input means, outline conversion means for applying outline conversion to the pieces of character information included in the image data input by the input means, using vector data, management means for managing a character type of the pieces of character information recognized by the character recognition means and the vector data having undergone outline conversion by the outline conversion means by associating the character type and the vector data with each other, determination means for determining upon recognizing the pieces of character information by the character recognition means whether the character type of the pieces of character information has undergone previous outline conversion and control means for, if the determination means determines that the character type has undergone the previous outline conversion, controlling the management means to execute management using vector data used in the previous outline conversion.

In order to solve the problems, according to the present invention, there is provided an image processing apparatus, wherein the input means inputs image data obtained by scanning a document.

In order to solve the problems, according to the present invention, there is provided an image processing apparatus, wherein the management means executes management by associating information that pertains to a character color with the vector data, and the determination means makes a determination on the basis of not the character color but whether the character type is identical to one having undergone the previous outline conversion.

In order to solve the problems, according to the present invention, there is provided an image processing apparatus, wherein the management means manages information that pertains to a character size by associating the information with the vector data, and the determination means makes a determination on the basis of not the character size but whether the character type is identical to one having undergone the previous outline conversion.

In order to solve the problems, according to the present invention, there is provided an image processing apparatus further comprising conversion means for converting information managed by the management means into a format that can be handled by predetermined document creation software.

In order to solve the problems, according to the present invention, there is provided an image processing apparatus, wherein the conversion means segments the image data input by the input means into a plurality of objects in accordance with properties of the objects and independently applies a process to each object.

In order to solve the problems, according to the present invention, there is provided an image processing apparatus, wherein the conversion means applies, to each of the plurality of objects, at least one of outline conversion by the outline conversion means, conversion of a line art object into vector data, and conversion of an image object into a predetermined image format.

In order to solve the problems, according to the present invention, there is provided an image processing method comprising an input step of inputting image data, a character recognition step of sequentially recognizing pieces of character information included in the image data input in the input step, an outline conversion step of applying outline conversion to the pieces of character information included in the image data input in the input step, using vector data, a management step of managing a character type of the pieces of character information recognized in the character recognition step and the vector data having undergone outline conversion in the outline conversion step by associating the character type and the vector data with each other, a determination step of determining upon recognizing the pieces of character information in the character recognition step whether the character type of the pieces of character information has undergone previous outline conversion and a control step of, if it is determined in the determination step that the character type has undergone the previous outline conversion, controlling to execute management in the management step using vector data used in the previous outline conversion.

In order to solve the problems, according to the present invention, there is provided a program for causing a computer to execute an input procedure for inputting image data, a character recognition procedure for sequentially recognizing pieces of character information included in the image data input in the input procedure, an outline conversion procedure for applying outline conversion to the pieces of character information included in the image data input in the input procedure using vector data, a management procedure for managing a character type of the pieces of character information recognized in the character recognition procedure and the vector data having undergone outline conversion in the outline conversion procedure by associating the character type and the vector data with each other, a determination procedure for determining upon recognizing the pieces of character information in the character recognition procedure whether the character type of the pieces of character information has undergone previous outline conversion and a control procedure for, if it is determined in the determination procedure that the character type has undergone the previous outline conversion, controlling to execute management in the management procedure using vector data used in the previous outline conversion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 6 is a view showing an example of the block information for the blocks obtained in the block selection process;

DETAILED DESCRIPTION OF THE PREFERRED EMBODIMENTS

Embodiments of the present invention will be described below with reference to the accompanying drawings.

First Embodiment

Figure 1:
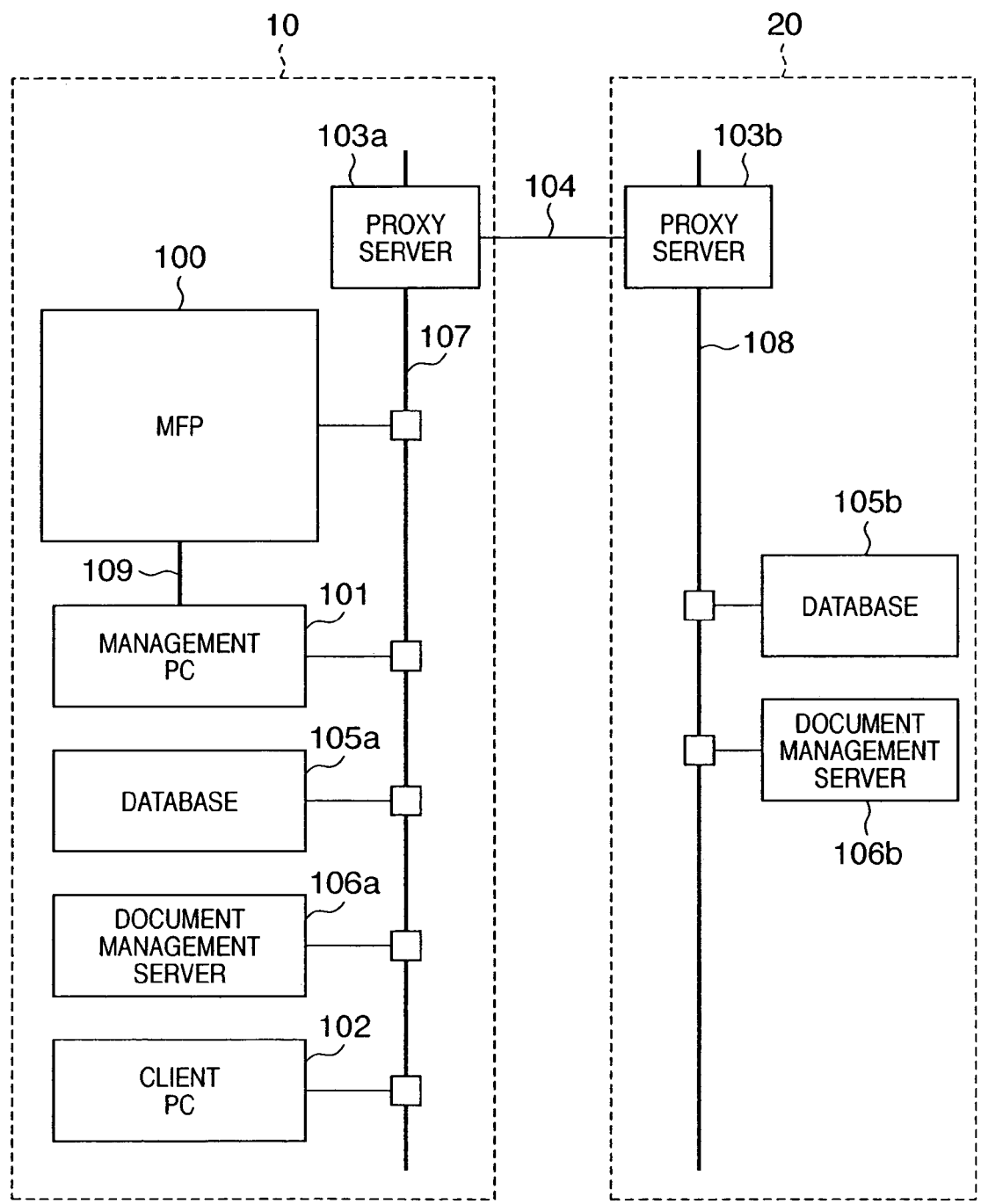
FIG. 1 is a block showing the arrangement of an image processing system according to the first embodiment of the present invention.

FIG. 1 is a block diagram showing the arrangement of an image processing system according to the first embodiment of the present invention. The image processing system in FIG. 1 is implemented in an environment in which offices 10 and 20 are connected via a network 104 such as the Internet.

To a LAN 107 formed in the office 10, an MFP 100, a management PC 101 for controlling the MFP 100, a client PC 102, a document management server 106a, its database 105a, and a proxy server 103a are connected. To a LAN 108 formed in the office 20, a document management server 106b, its database 105b, and a proxy server 103b are connected. Note that the client PC 102 comprises an external storage unit, search image input unit, and search result output unit. The LAN 107 and the LAN 108 in the office 20 are connected to the network 104 such as the Internet via the proxy servers 103a and 103b.

The MFP 100 has charge of an image scanning process of optically scanning a paper document and converting it into an image signal and some of image processes for the scanned image signal in this embodiment, and supplies an image signal to the management PC 101 via a LAN 109. The management PC 101 can be implemented by a general PC, which incorporates an image storage unit, image processing unit, display, input unit, and the like. Some or all of the components of the management PC 101 may be integrally formed with the MFP 100.

Figure 2:
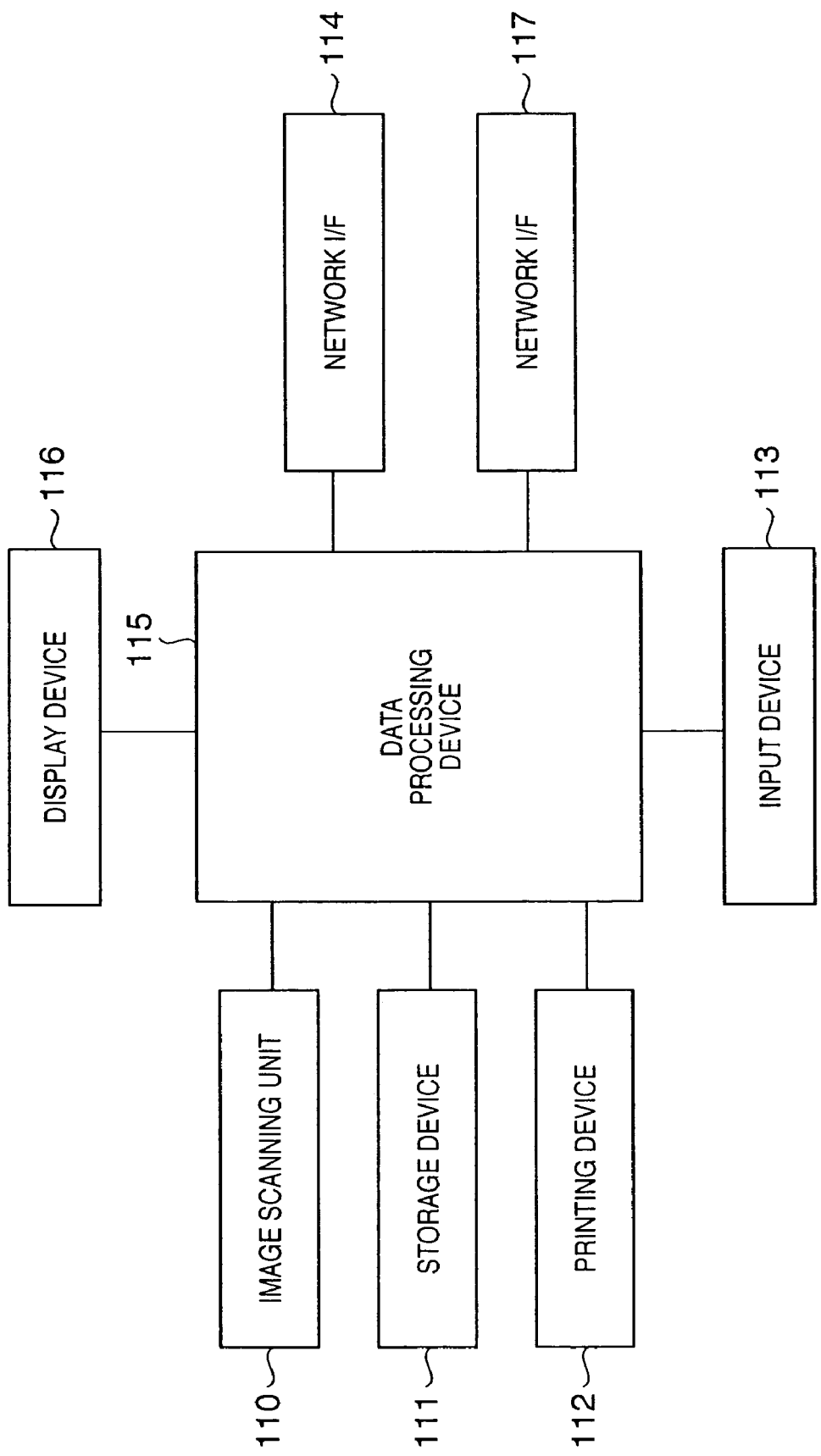
FIG. 2 is a block diagram showing the arrangement of an MFP according to the first embodiment of the present invention.

FIG. 2 is a block diagram showing the arrangement of the MFP 100 according to the first embodiment of the present invention. Referring to FIG. 2, an image scanning unit 110 including an auto document feeder (to be abbreviated as an "ADF" hereinafter) irradiates a document image on one or a plurality of stacked documents with light coming from an internal light source, forms an image of light reflected by the document on a solid-state image sensing element via a lens, and obtains a scanned image signal in the raster order as image information at a resolution of, e.g., 600 dpi, from the solid-state image sensing element. In a normal copy function, a data processing device 115 executes an image process of that image signal to convert it into a recording signal. In the case of a multi-copy process, the data processing device 115 temporarily stores recording data of one page in a storage device 111, and sequentially outputs that data to a printing device 112, thus printing images on paper sheets.

Print data output from the client PC 102 is input to the MFP 100 via the LAN 107, is received by the data processing device 115 via a network I/F 114, and is then converted into recordable raster data by the data processing device 115. The raster data is then output to the printing device 112 to print a recording image on a paper sheet.

The operator inputs instructions to the MFP using an input device 113 such as a key equipped on the MFP, or an input device of the management PC 101 which includes a keyboard and mouse. Such series of operations are controlled by a controller in the data processing device 115.

A display device 116 of the MFP 100, the monitor of the management PC 101, or the monitor of the client PC 102 displays status of operation inputs and image data whose process is underway. Note that the storage device 111 is also controlled from the management PC 101, and data exchange and control between the MFP 100 and the management PC 101 are done via a network I/F 117 and the directly connected LAN 109.

[Overview of Process]

Figure 3:
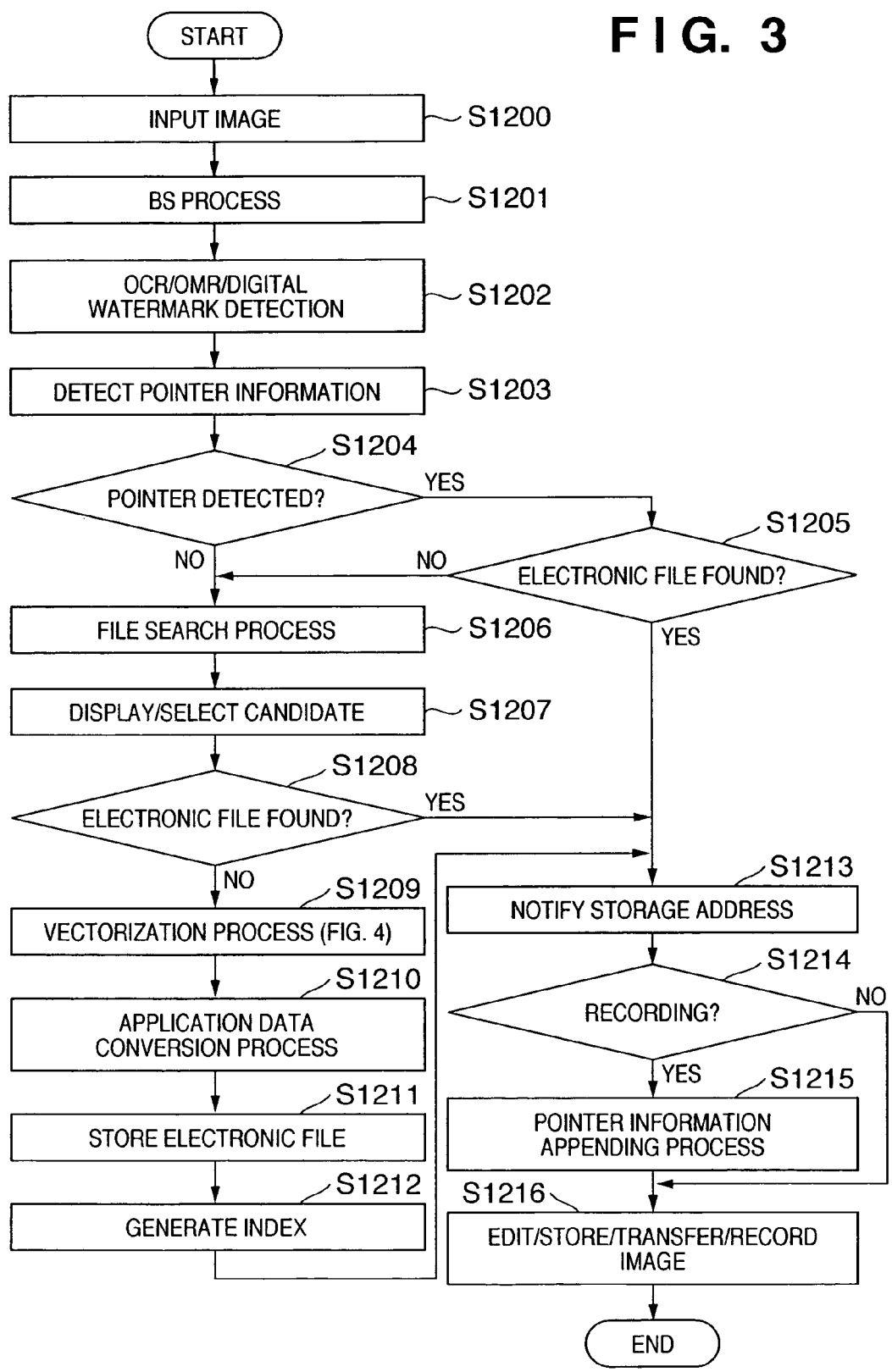
FIG. 3 is a flowchart for explaining the procedure for an image process by the image processing system according to the first embodiment of the present invention.

An overview of the entire image process by an image processing system according to an embodiment of the present invention will be described below. FIG. 3 is a flowchart for explaining the procedure for an image process by the image processing system according to the first embodiment of the present invention.

The image scanning unit 110 of the MFP 100 is enabled to raster-scan one original and to obtain, e.g., a 8-bit image signal of a 600 dpi (image information input process: step S1200). This image signal undergoes a pre-process by the data processing device 115, and is stored as image data of one page in the storage device 111.

A CPU of the management PC 101 separates regions of a text/line image part and halftone image part from the image signal stored in the storage device 111. The CPU further separates a text part into blocks combined as clusters for respective paragraphs and a line image part into tables and graphics formed of lines, and converts these blocks, tables, and graphics into segments. On the other hand, the CPU segments the image part expressed by halftone into independent objects for respective so-called blocks (e.g., a rectangular image part block, background part block, and the like) (BS process: step S1201).

At this time, a two-dimensional barcode or an object corresponding to URL, which is recorded in the document image as additional information, is detected. In this case, the URL undergoes character recognition in an OCR (optical character recognition) process, and the two-dimensional barcode or object is decoded (step S1202).

Pointer information in the storage device that stores an original electronic file of that document is detected (step S1203). As a method of appending the pointer information, a method of using an invisible digital watermark such as a method of embedding information between neighboring characters, a method of embedding information in a halftone image, or the like may be adopted. If the additional information is embedded as a digital watermark, the watermark information is detected and is decoded in step S1202.

It is determined whether any pointer information is detected (in step S1204). If any pointer information is detected (YES), the electronic file corresponding to the document is searched for from an address indicated by the pointer (step S1205). The electronic file is stored in one of a hard disk in the client PC 102, the database 105a or 105b in the document management server 106a or 106b connected to the LAN 107 or 108 in the office 10 or 20, and the storage device 111 of the MFP 100 itself, and a search is conducted in these storage devices in accordance with the address information obtained in step S1203.

If no electronic file is found (NO) or if the found file is an image file represented by JPEG, PDF, or tiff (i.e., an image file which cannot be re-used or re-edited by an existing document creation software or the like), the flow branches to step S1206. If the pointer information itself is not found in step S1204 as well, the flow braches to step S1206 (NO).

Step S1206 is a so-called document search process routine. A full-text search is conducted by extracting words from the results of the OCR process which is executed for text blocks in step S1202, or a so-called layout search is conducted using the layout and properties of respective objects. As a result of the search process, if electronic files with high similarity levels are found, the electronic files are displayed as thumbnails or the like (step S1207). If the operator is required to make some selection (e.g., when a plurality of electronic files are found), a file is specified from the plurality of electronic files by an operator's input operation. If only one electronic file is found as a candidate, the flow automatically branches from step S1208 to step S1213 to supply a storage address.

If no electronic file is found by the search process in step S1206 or if the specified electronic file is a so-called image file represented by PDF, tiff, or the like, the flow branches to step S1209 to execute a vectorization process.

Figure 4:
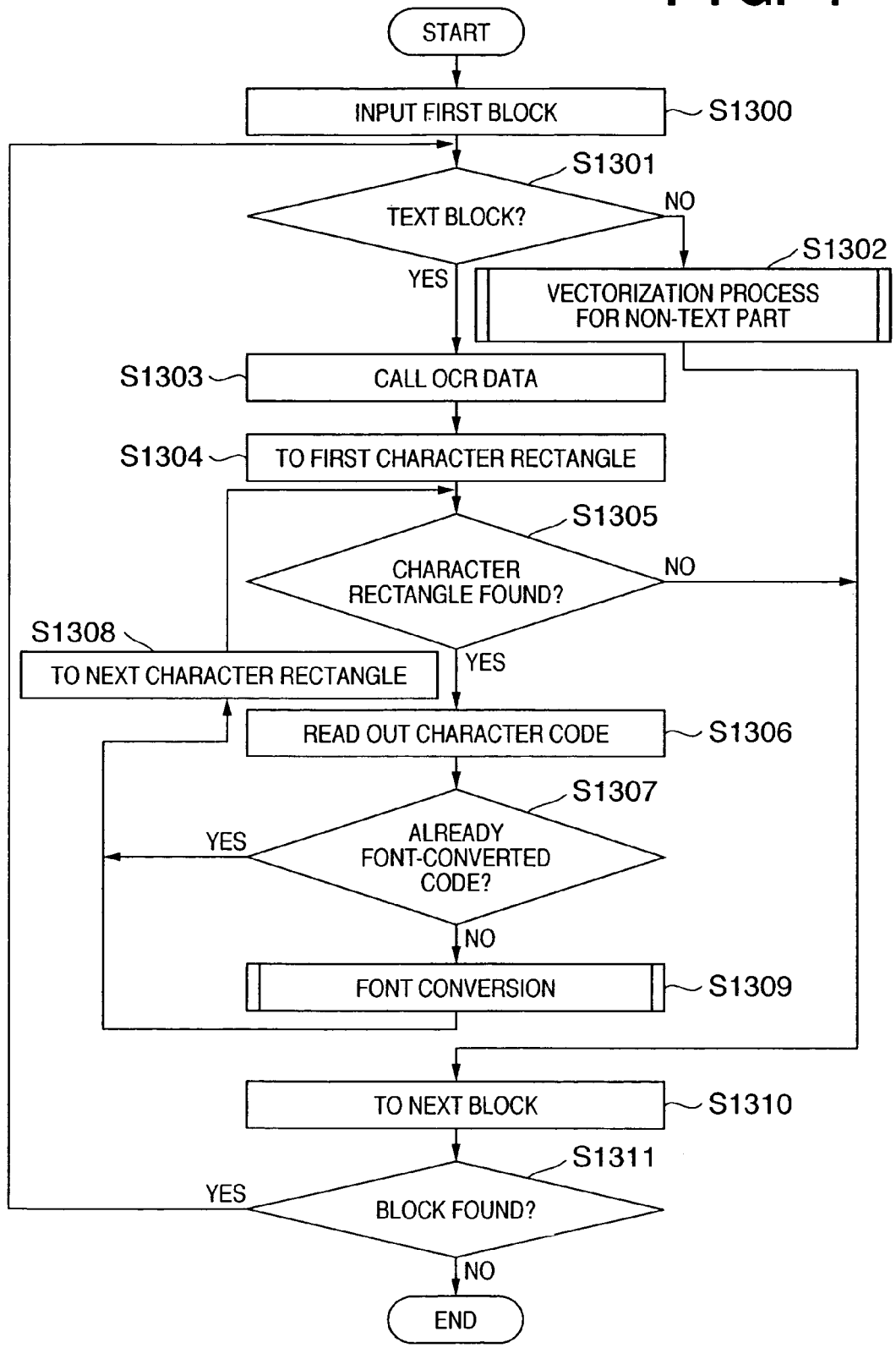
FIG. 4 is a flowchart for explaining the details of a vectorization process in the image process by the image processing system according to the first embodiment of the present invention.

Step S1209 forms the main point of the present invention. Step S1209 converts raster image data into vector data, thereby generating an electronic file which is similar to an original electronic file, is easy to edit, and has a small size. Details of this process will be described with reference to FIG. 4. FIG. 4 is a flowchart for explaining the details of the vectorization process in the image process by the image processing system according to the first embodiment of the present invention.

Out of the blocks obtained in step S1201, one at the head (determined using the upper left corner of an image as an origin) is input (step S1300). Then, it is determined whether the input block is a text block (step S1301). If it is determined that the block is a text block (YES), all OCR data of the block obtained in step S1202 is read out (step S1303). The control target shifts to the position for a character rectangle at the head (at the origin in the left corner) (step S1304).

It is confirmed if any character rectangle is present at the position (step S1305). If any character rectangle is found (YES), a character code corresponding to the character rectangle is read out (step S1306). It is determined whether the character code in the character rectangle is already converted (step S1307). If the character code is already converted (YES), the control target shifts to the next character rectangle (step S1308). The next character rectangle undergoes processes from step S1305. Note that step S1307 determines identity of character codes. Character colors and character sizes may differ.

If it is determined in step S1307 that the character code is not converted (NO), i.e., the character code has never appeared, font recognition/conversion is executed for the character code, and the font data is registered (step S1309). The control target shifts to the next character rectangle (step S1308) to execute the processes from step S1305 for the next character rectangle.

If it is determined in step S1305 that no more character rectangle is found (NO), i.e., all the character rectangles in the text block have undergone the process, the control target shifts to the next block (step S1310). It is determined whether the next block is present (step S1311). If the next block is present (YES), it is determined whether the block is a text block (step S1301). If it is determined that the block is not a text block (NO), the predetermined vectorization process is executed for the block (step S1302), and the control target shifts to the next block (step S1310). If it is determined in step S1301 that the block is a text block (YES), the above-mentioned process is executed for the block.

If no more block is found in step S1311 (NO), it is determined that all the blocks have undergone the process, and the vectorization process ends. With this process, heavy load of font recognition/conversion necessary for each character rectangle is minimized, and the vectorization process can efficiently be executed. In other words, a heavy-load font conversion/recognition process need not be executed for each character, and a large increase in processing speed can be expected. Vector data obtained by the vectorization process is stored while being associated with information such as a corresponding character code, character color, character size, and the like.

After the vectorization process in step S1209 described with reference to FIG. 4 is executed for the blocks, the image processing system according to this embodiment uses the document layout information to execute an application data conversion process such as conversion to rtf (step S1210). The file obtained after the conversion is stored in the storage device 111 as an electronic file (step S1211).

Index information for search is generated for the vectorized document image so that the document image can be directly searched for as an electronic file upon executing a similar process (step S1212), and is added to a retrieval index file. Then, the operator is notified of the storage address (step S1213).

Furthermore, it is determined whether the process to be done by the operator is a recording process (step S1214). If the process to be done by the operator is a recording process (YES), the flow branches to step S1215 to append pointer information to the file as image data.

If the electronic file can be specified by the search process in step S1208 (YES), the flow similarly branches to step S1213 to directly specify the electronic file. In step S1213, the operator is notified of the storage address. If the electronic file is to be printed on a paper sheet (YES in step S1214), pointer information is similarly appended to the electronic file (step S1215). If the electronic file can be specified from the pointer information in step S1205 or the electronic file can be specified by the search process (YES), the operator is notified of the storage address of the electronic file (step S1213).

Note that a text modification process and image edit, storage, transfer, and printing processes can be executed in step S1216 using an electronic file itself obtained by this embodiment.

The above-mentioned processes not only make re-use, re-editing, or the like easier than a case using image data, but also can increase the storage efficiency and shorten the transfer time since the information is reduced. A document can advantageously be printed and displayed as high-quality data.

The processing blocks will be described in detail below.

The block selection (BS) process indicated by step S1201 will be described first.

[Block Selection Process]

Figure 5:
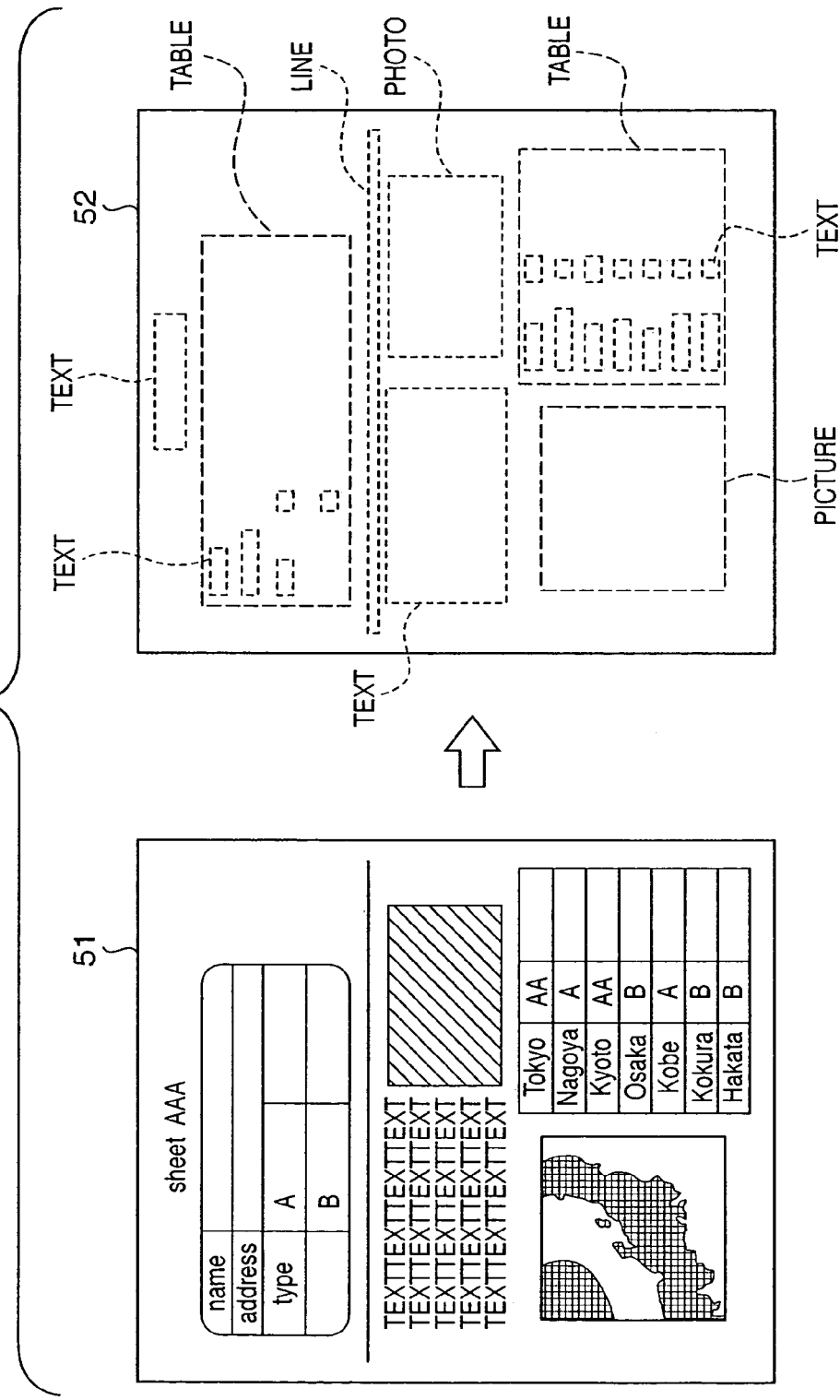
FIG. 5 is a view showing how a block selection process determines the property of one scanned image data and divides the image data into a plurality of blocks.

FIG. 5 is a view showing how a block selection process determines the property of one scanned image data and divides the image data into a plurality of blocks. More specifically, in the block selection process, image data of one page scanned in step S1200 indicated by reference numeral 51 is recognized as clusters for respective objects (as indicated by reference numeral 52), properties such as text (Text), photo (Photo), line (Line), table (Table), and the like of respective blocks are determined, and the image data is segmented into regions (blocks) having different properties.

One example of the block selection process will be described below.

An input image is binarized to a monochrome image, and a cluster of pixels bounded by an outline of black pixels is extracted by outline tracing of black pixels. For a cluster of black pixels with a large area, outline tracing is also made for white pixels in the cluster to extract clusters of white pixels. Furthermore, a cluster of black pixels is recursively extracted from the cluster of white pixels with a predetermined area or more. The above-mentioned process is executed for a document on which black characters and the like are printed on a white background. In the case of other documents, the process can similarly be made by setting a color corresponding to the background as "white" and that corresponding to an object as "black".

The obtained clusters of black pixels are classified into regions having different properties in accordance with their sizes and shapes. For example, a pixel cluster which has an aspect ratio close to 1, and has a size that falls within a predetermined range is determined as that corresponding to a character. Furthermore, a part where neighboring characters regularly line up and can be grouped is determined as a text region. Also, a flat pixel cluster is categorized as a line region, a range occupied by black pixel clusters that include rectangular white pixel clusters which have a predetermined size or more and regularly line up is categorized as a table region, a region where pixel clusters with indeterminate forms are distributed is categorized as a photo region, and any other pixel cluster with an arbitrary shape is categorized as a picture region, and so forth.

FIG. 6 is a view showing an example of the block information for the blocks obtained in the block selection process. These pieces of information for respective blocks shown in FIG. 6 are used to execute vectorization or to conduct a search, as will be described later.

[Detection of Pointer Information from Image Data]

The OCR/OMR process (indicated by step S1202) of extracting the storage location of an electronic file from scanned image data will be described first.

<<Character Recognition>>

In a character recognition process according to this embodiment, an image extracted for each character is recognized using one of pattern matching methods to obtain a corresponding character code. In this recognition process, an observation feature vector obtained by converting a feature acquired from a character image into a several-ten-dimensional numerical value string is compared with a dictionary feature vector obtained in advance for each character type, and a character type with a shortest distance is output as a recognition result. Various known methods are available for feature vector extraction. For example, a method of dividing a character into a mesh pattern, and counting character lines in respective meshes as line elements depending on their directions to obtain a (mesh count)-dimensional vector as a feature can be adopted.

When a text region extracted by the block selection process (step S1201) undergoes character recognition, the writing direction (horizontal or vertical) is determined for that region, lines are extracted in the corresponding directions, and character images are then obtained by extracting characters. Upon determining the writing direction (horizontal or vertical), horizontal and vertical projections of pixel values in that region are calculated, and if the variance of the horizontal projection is larger than that of the vertical projection, that region can be determined as a horizontal writing region; otherwise, that region can be determined as a vertical writing region.

Upon decomposition into character strings and characters, in the case of horizontal writing, lines are extracted using the horizontal projection, and characters are extracted based on the vertical projection for the extracted line. In the case of a vertical writing text region, the relationship between the horizontal and vertical parameters may be exchanged. Note that a character size can be detected based on the extracted size.

<<Barcode Scanning>>

Figure 7:
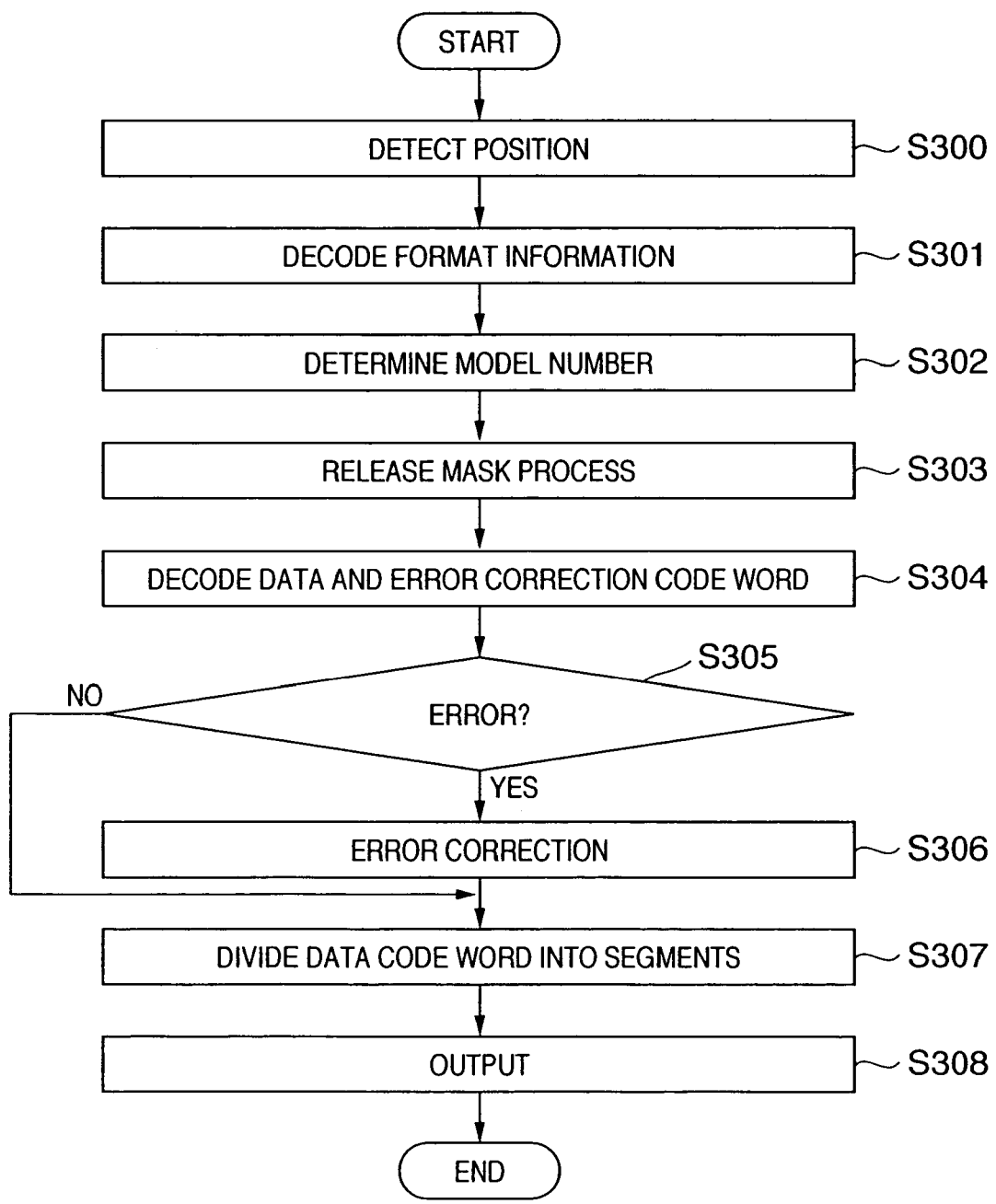
FIG. 7 is a flowchart for explaining the procedure for decoding a two-dimensional barcode (QR code symbol) appended into a document image and outputting a data character string.
Figure 8:
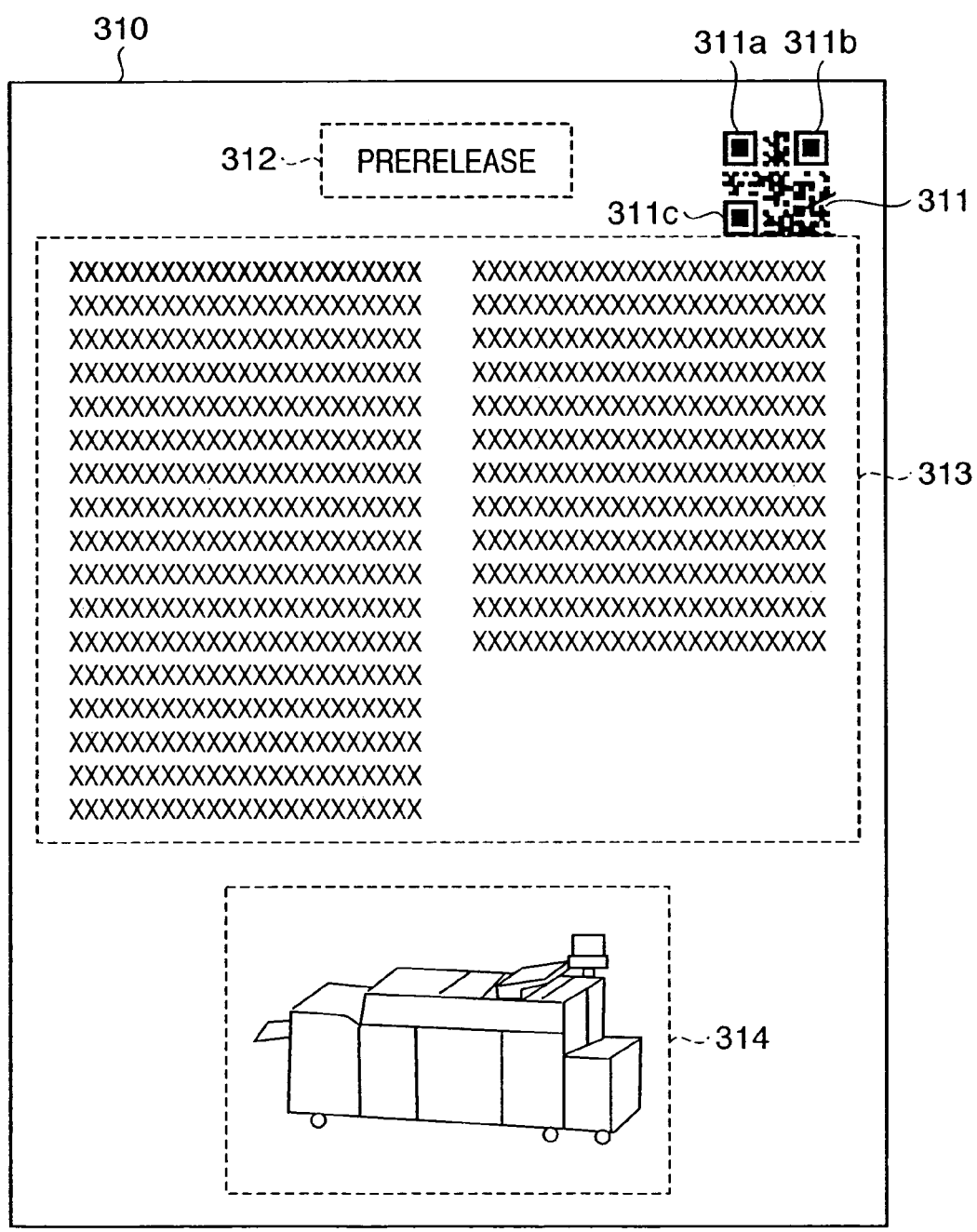
FIG. 8 is a view showing an example of a document 310 appended with a two-dimensional barcode.

FIG. 7 is a flowchart for explaining the procedure for decoding a two-dimensional barcode (QR code symbol) appended into a document image and outputting a data character string. FIG. 8 is a view showing an example of a document 310 appended with a two-dimensional barcode.

The internal CPU scans image data which is stored in a page memory in the data processing device 115 and is obtained by scanning the document 310 to detect the position of a predetermined two-dimensional barcode symbol 311 from the result of the above-mentioned block selection process. A position detection pattern of a QR code is made up of identical position detection element patterns 311a to 311c, which are located at three out of the four corners of the symbol (step S300).

Next, format information that neighbors the position detection pattern is decoded to obtain an error correction level and mask pattern applied to the symbol (step S301). After a model number of the symbol is determined (step S302), an encoded region bit pattern is XORed using the mask pattern obtained from the format information to cancel the mask process (step S303).

A symbol character is read in accordance with the layout rule corresponding to the model so as to decode message data and an error correction code word (step S304). It is detected if a decoded code includes an error (step S305). As a result, if any error is detected (YES), that error is corrected (step S306). A data code word is divided into segments on the basis of a mode indicator and character count indicator from the error-corrected data (step S307). Finally, data characters are decoded on the basis of a specification mode, thus outputting the result (step S308). If no error is detected in step S305 (NO), the flow advances to step S307.

Note that data to be encoded in the two-dimensional barcode represents server address information (pointer information) where the corresponding file is stored, which information is formed of path information including an IP address indicating a file server name and server address, a corresponding URL, or the like.

In this embodiment, the document 310 appended with the pointer information using the two-dimensional barcode has been exemplified. Alternatively, pointer information may be recorded using a character string. In this case, a block of a character string according to a predetermined rule is detected by the above block selection process, and characters of the character string that indicates the pointer information undergo character recognition, thus obtaining the server address information of the server that stores the original electronic file.

Furthermore, pointer information can be assigned by embedding watermark information in the character spacings by applying imperceptible modulation to, e.g., the spacings between neighboring characters in a character string of a text block 312 or 313 of the document 310 shown in FIG. 8. When such watermark information is used, pointer information can be acquired by detecting the character spacings upon executing a character recognition process (to be described later). Also, pointer information can be assigned as a digital watermark in a natural image block 314.

[File Search Based on Pointer Information]

Figure 9:
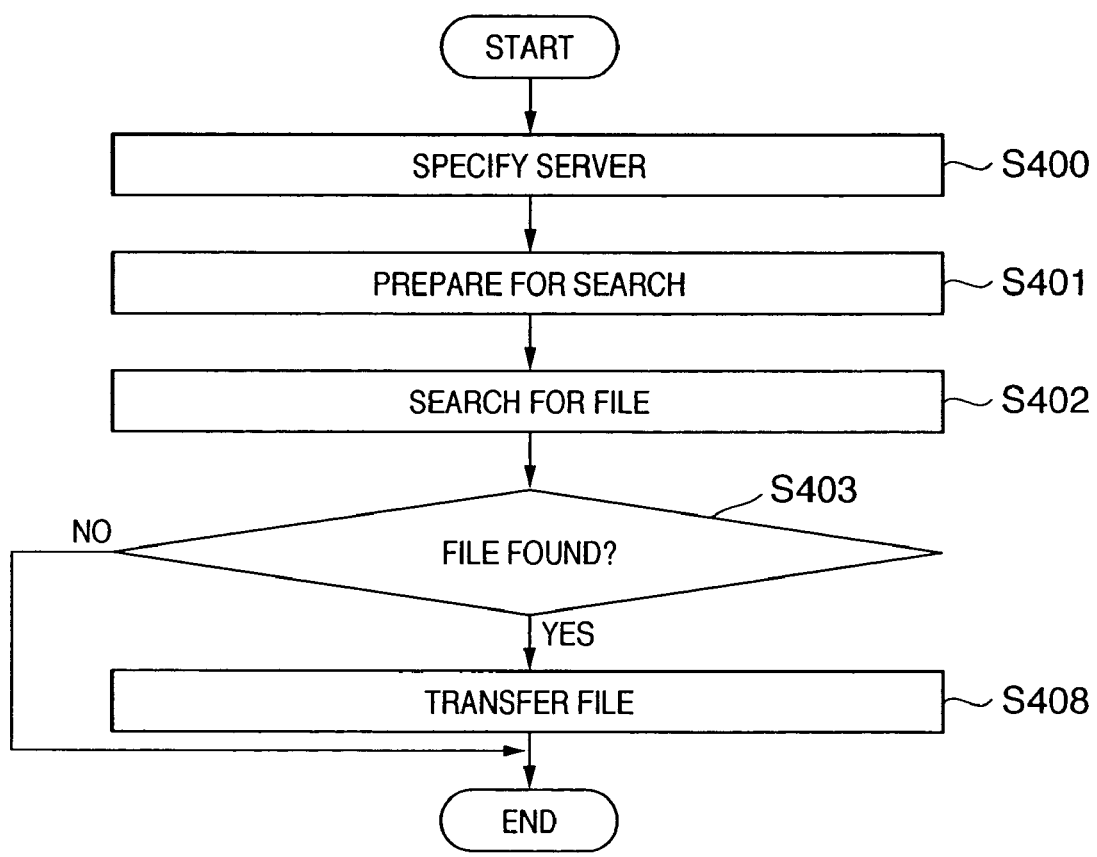
FIG. 9 is a flowchart for explaining the procedure for a process of searching for an electronic file in a server which stores the electronic file on the basis of detected pointer information.

The search process of the server that stores electronic files using the pointer information in steps from step S1203 described with reference to FIG. 3 will be described in detail below. FIG. 9 is a flowchart for explaining the procedure for a process of searching for an electronic file in a server which stores the electronic file on the basis of detected pointer information.

A file server that stores an electronic file of interest is specified based on a server address included in the pointer information (step S400). Note that the file server indicates the client PC 102, the document management servers 106a and 106b that incorporate the databases 105a and 105b, or the MFP 100 itself that incorporates the storage device 111. Also, the address is a URL or path information including a URL or server name.

After the file server is specified, the control requests the file server to make preparation required to search the server (file server) indicated by the pointer information in step S127 described with reference to FIG. 3 (step S401). The file server searches for the electronic file of interest according to the file search process in step S128 (step S402). It is determined whether the electronic file is found (step S403).

As a result, if no electronic file is found (NO), the control notifies the MFP 100 of a message that advises accordingly. On the other hand, if any electronic file is found (YES), candidates are displayed to execute the processes in steps S129 to S132, as has been described above with reference to FIG. 3. After that, the address of the electronic file of interest is notified, and that electronic file is transferred to the user (i.e., the MFP 100) (step S408).

[File Search Process Based on Pointer Information Including File Access Right]

Figure 10A:
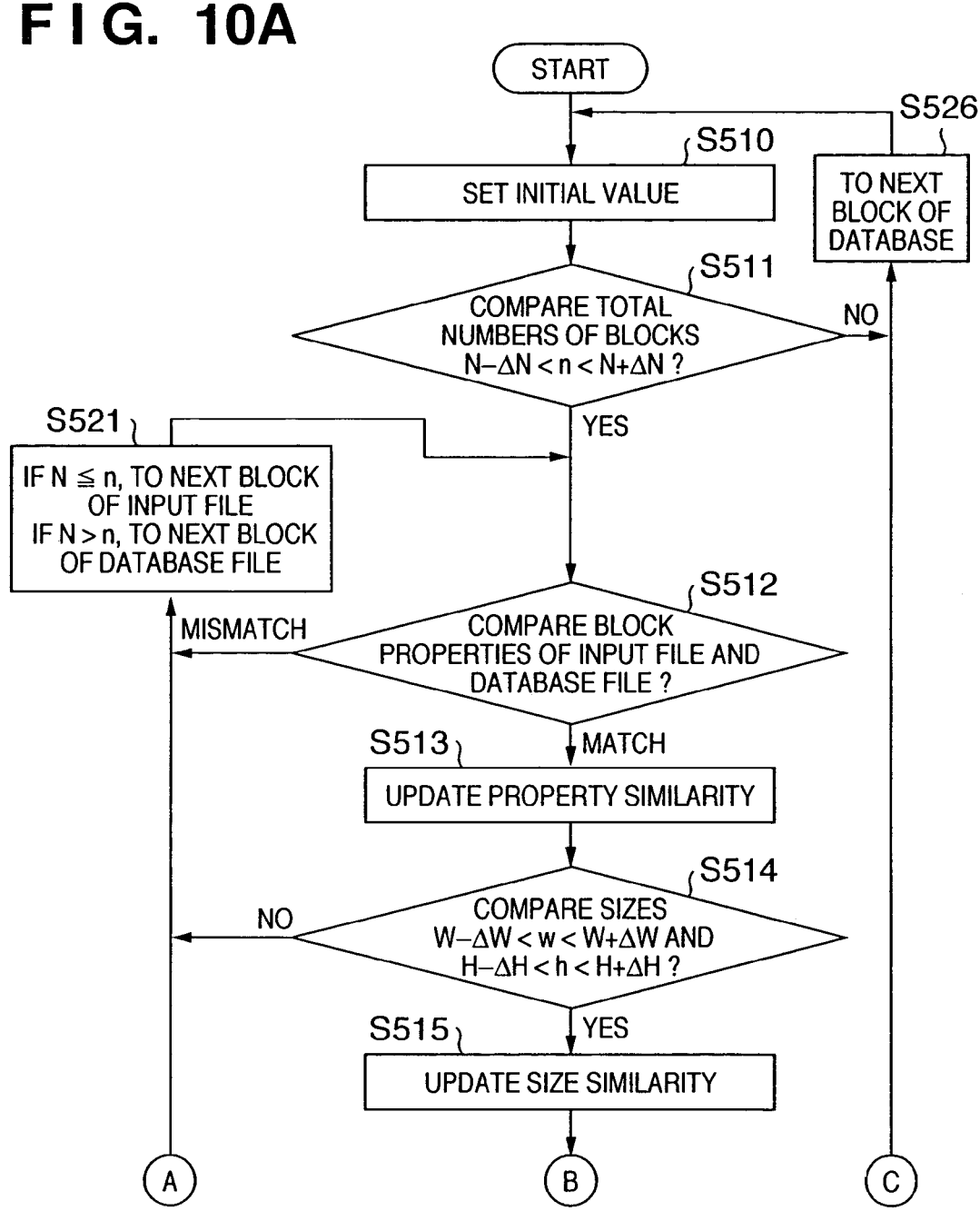
FIGS. 10A and 10B are flowcharts for explaining the procedure for a layout search process in search for an electronic file similar to an input image file in a database.
Figure 10B:
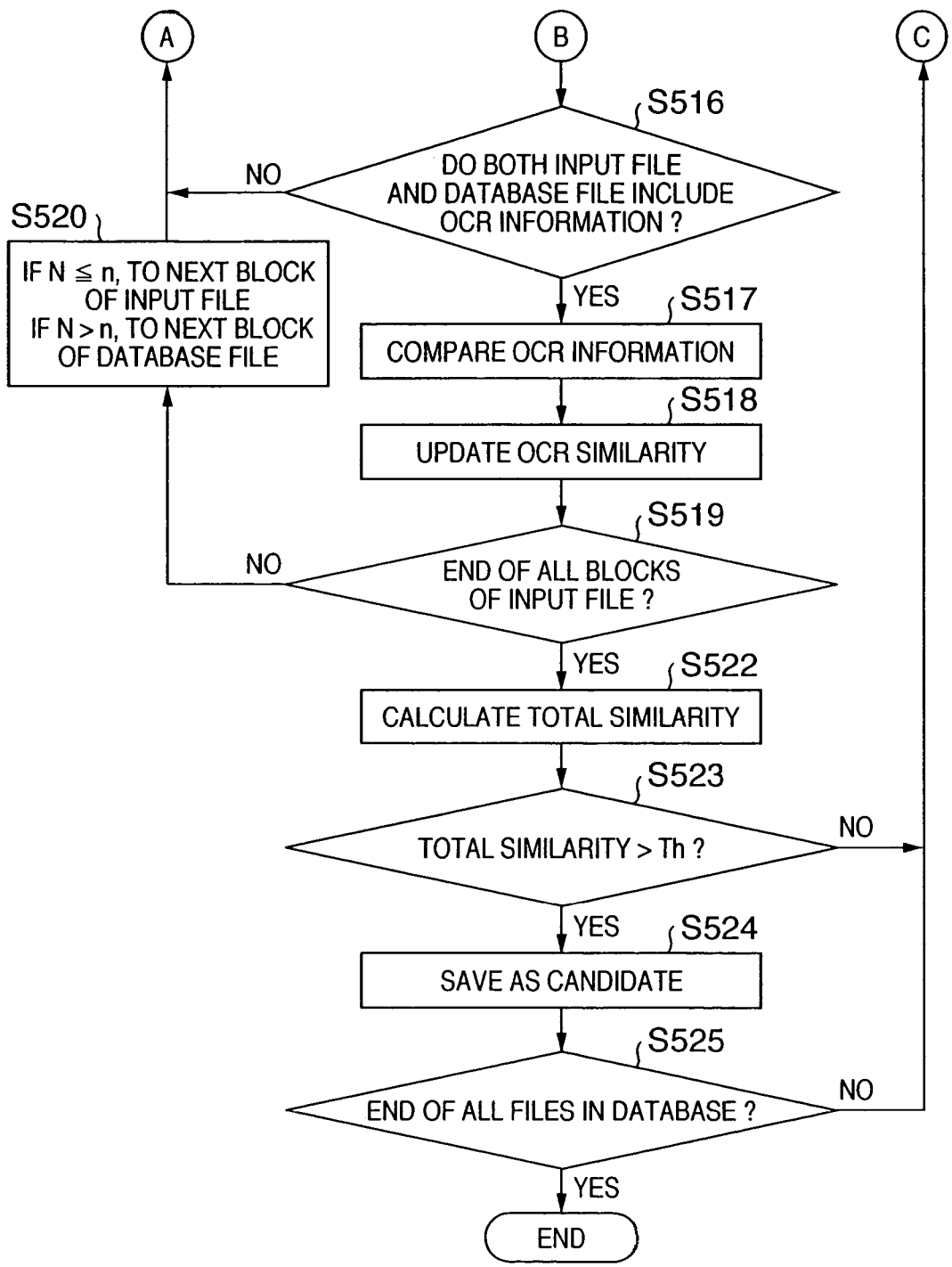

The file search process shown in step S1206 in FIG. 3 will be described in detail below with reference to FIGS. 6, 10A and 10B. The process in step S1206 is done if an input document (input file) has no pointer information, if pointer information is available but no electronic file is found or if the found electronic file is an image file in step S1204.

Assume that blocks and an input file extracted as a result of the OCR/OMR process in step S1202 have information (block information, input file information) shown in FIG. 6. In this embodiment, as the information contents, a property, coordinate position, width and height as a size, and availability of OCR information are used, as shown in FIG. 6.

The properties are categorized into text, line, photo, picture, table, and the like. For the sake of simplicity, respective blocks are respectively named as blocks 1, 2, 3, 4, 5, and 6 in ascending order of coordinate X (e.g., X1<X2<X3<X4<X5<X6) in FIG. 6. The total number of blocks indicates that of those included in an input file, and is 6 in FIG. 6. The procedure for a process of executing layout search in the database for electronic files similar to an input image file will be described below. FIGS. 10A and 10B are flowcharts for explaining the procedure for a layout search process in search for an electronic file similar to an input image file in the database. Assume that files stored in the database have the same kinds of information as those in FIG. 6. In the flow of the flowchart shown in FIGS. 10A and 10B, the electronic file scanned from an input document is compared in turn with electronic files in the database.

Similarity levels and the like (to be described later) are initialized to set initial values (step S510). The total numbers of blocks are compared (step S511). If true in step S511 (YES), respective pieces of information of blocks in files are compared in turn (step S512). That is, it is checked if the number n of blocks of each file in the database falls within the range of an error ΔN of the number N of blocks of the input file. If n falls within the error range, "true" (YES) is determined; otherwise, "false" (NO) is determined. In step S512, block properties of the input file and each database file are compared. If the two properties match, the flow advances to comparison processes from step S513; otherwise, the flow advances to step S521.

Upon comparing information of blocks, property, size, and OCR similarity levels are respectively calculated in steps S513, S515, and S518, and a total similarity level is calculated based on these levels in step S522. Since a method of calculating each similarity level can use a known technique, a description thereof will be omitted.

It is determined in step S523 whether the total similarity level is higher than a pre-set threshold value Th. If the total similarity level is higher than the threshold value (YES), that electronic file is determined as a similar candidate and is saved (step S524). In FIGS. 10A and 10B, N, W, and H are respectively the total number of blocks, each block width, and each block height in an input file, and ΔN, ΔW, and ΔH are values which consider errors with reference to the block information of the input file. Also, n, w, and h are respectively the total number of blocks, each block width, and each block height in a file stored in the database. Note that position information (X,Y) and the like may be compared upon comparing sizes in step S514.

As a result of the above-mentioned search process, database files which have total similarity levels higher than the threshold value Th and are saved as candidates are displayed as thumbnails or the like (step S1207). If the operator must select one of a plurality of candidates, a file is specified by the operator's input operation.

[Font Recognition/Conversion and Vectorization of Non-Text Part]

The procedure for the vectorization process indicated by step S1209 in FIG. 3 has been described with reference to FIG. 4. In the following description, a font conversion process (step S1309) and a vectorization process for a non-text part (step S1302) in FIG. 4 will be explained in detail.

<<Font Recognition>>

A plurality of sets of dictionary feature vectors for the number of character types used in character recognition are prepared in correspondence with character shape types, i.e., font types, and a font type is output together with a character code upon matching (character recognition), thus recognizing the font of a character.

<<Font Conversion>>

Using a character code and font information obtained by the character recognition process and the font recognition process, and outline data prepared in advance, information of a character part is converted into vector data. If an input original document is a color document, the color of each character is extracted from the color image and is recorded together with vector data.

With the above processes, image information which belongs to a text block can be converted into vector data with a nearly faithful shape, size, and color.

Note, at this time, it is determined whether the outline data corresponding to the recognized font information is found. As a result, if the corresponding outline data is not found, as described later, a process same as vectorization of non-text part is executed to a document image and the character may be converted into the vector data.

Moreover, if character recognition accuracy and font recognition accuracy are low, as described later, the corresponding outline data is not found, as described later, a process same as vectorization of non-text part is executed to a document image and the character may be converted into the vector data.

<<Vectorization of Non-Text Part>>

For a region which is determined as a graphic or line, or table region by the block selection process in step S1201, outlines of pixel clusters extracted in each region of interest are converted into vector data. More specifically, a point sequence of pixels which form an outline is divided into sections at a point which is considered as a corner, and each section is approximated by a partial line or curve. Note that "corner" means a point corresponding to a maximal curvature.

Figure 11:
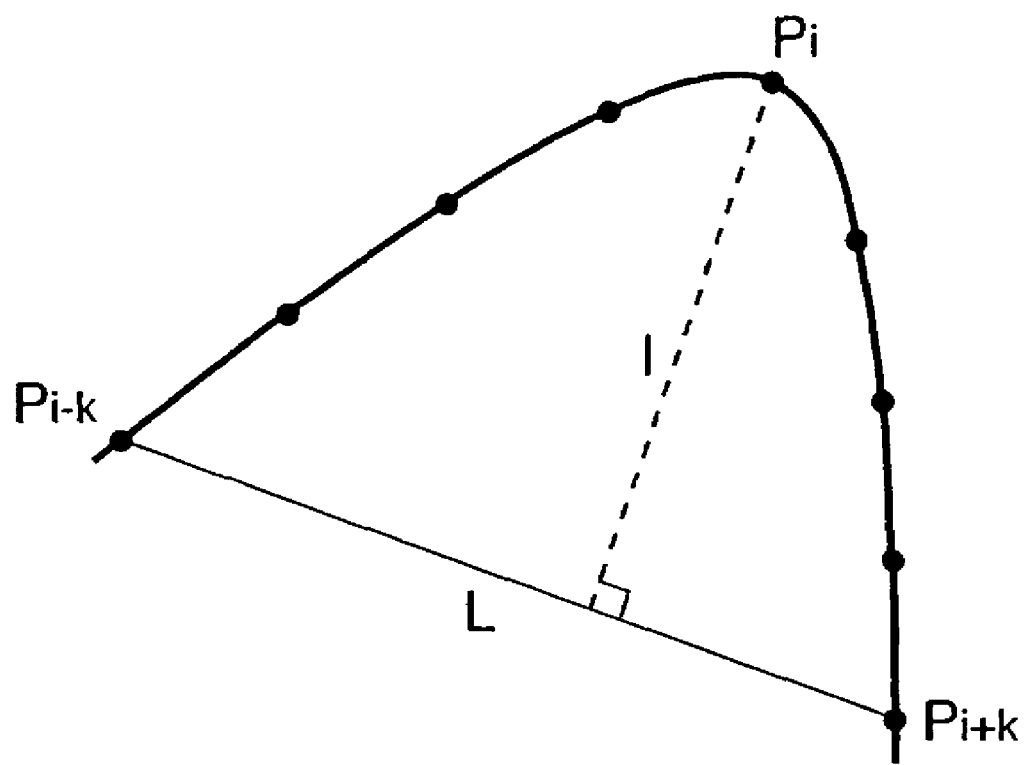
FIG. 11 is a view for explaining a point corresponding to a maximal curvature.

FIG. 11 is a view for explaining a point corresponding to a maximal curvature. As shown in FIG. 11, the point corresponding to the maximal curvature is obtained as a point where the distance between an arbitrary point Pi and a chord which is drawn between points Pi−k and Pi+k separated k points from the point Pi in the left and right directions becomes maximal. Furthermore, let R be the chord length/arc length between Pi−k and Pi+k. Then, a point where the value R is equal to or smaller than a threshold value can be considered as a corner. Sections obtained after division at each corner can be vectorized using a method of least squares or the like with respect to a point sequence for a line, and a ternary spline function or the like for a curve.

When an object has an inside outline, it is similarly approximated by a partial line or curve using a point sequence of a white pixel outline extracted by the block selection process.

As described above, using partial line approximation of outlines, an outline of a graphic with an arbitrary shape can be converted into vector data. When a document has a color image, the color of a graphic is extracted from the color image and is recorded together with vector data.

Figure 12:
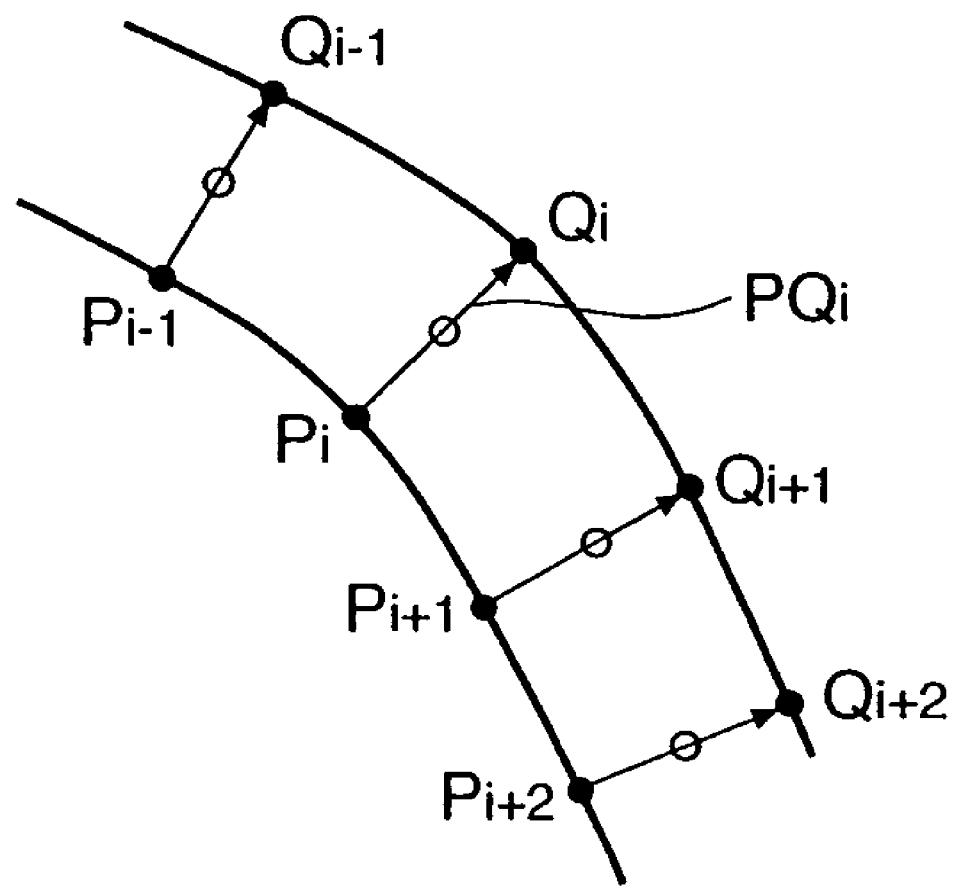
FIG. 12 is a view for explaining an example wherein an outside outline which is close to an inside outline or another outside outline is expressed as a line with a given width.

FIG. 12 is a view for explaining an example wherein an outside outline which is close to an inside outline or another outside outline is expressed as a line with a given width. When an outside outline is close to an inside outline or another outside outline in a given section, as shown in FIG. 12, two outlines may be combined to express a line with a given width. More specifically, lines are drawn from respective points Pi on a given outline to points Qi on another outline, each of which has a shortest distance from the corresponding point. When the distances PQi maintain a constant value or less on the average, the section of interest is approximated by a line or curve using PQi middle points as a point sequence, and the average value of the distances PQi is set as the width of that line or curve. A line or a table ruled line as a set of lines can be efficiently expressed as vector data as a set of lines having a given width, as described above.

As for vectorization using the character recognition process for a text block, a character which has the shortest distance from a dictionary as a result of the character recognition process is used as a recognition result, as described above. When this distance is equal to or larger than a predetermined value, the recognition result does not always match an original character, and a wrong character having a similar shape is often recognized. Therefore, in the present invention, such character is handled in the same manner as a general line art, as described above, and is converted into outline data. That is, even a character that causes a recognition error in the conventional character recognition process can be prevented from being vectorized to a wrong character, but can be vectorized based on outline data which is visually faithful to image data. Also, a block determined as a photo block is not vectorized in the present invention, and is output as image data without any modification.

<<Graphic Recognition>>

A process for grouping vectorized partial lines for each graphic object after the outline of a graphic with an arbitrary shape is vectorized, as described above, will be described below.

Figure 13:
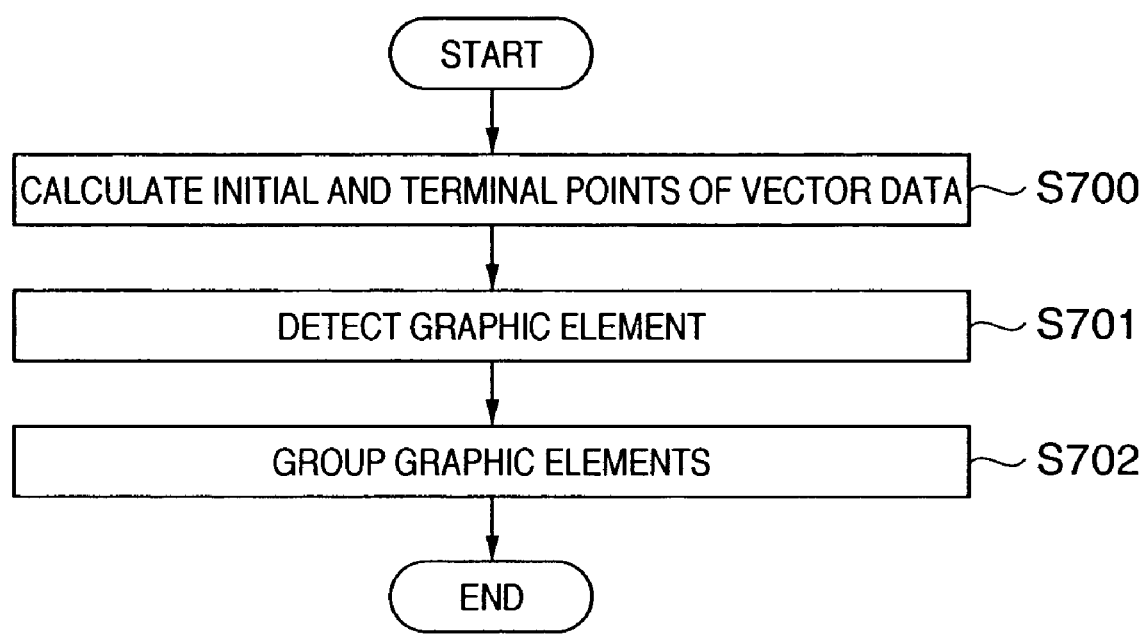
FIG. 13 is a flowchart for explaining the procedure for a process of grouping vector data for each graphic object.

FIG. 13 is a flowchart for explaining the procedure for a process executed until vector data are grouped for each graphic object. Initial and terminal points of each vector data are calculated (step S700). Using the initial point information and terminal point information of respective vectors, a graphic element is detected (step S701). Detecting a graphic element is to detect a closed graphic formed by partial lines. Such detection is made by applying the principle that each vector which forms a closed shape has vectors coupled to its two ends.

Next, other graphic elements or partial lines present in the graphic element are grouped to set a single graphic object (step S702). If other graphic elements or partial lines are not present in the graphic element, that graphic element is set as a graphic object.

Figure 14:
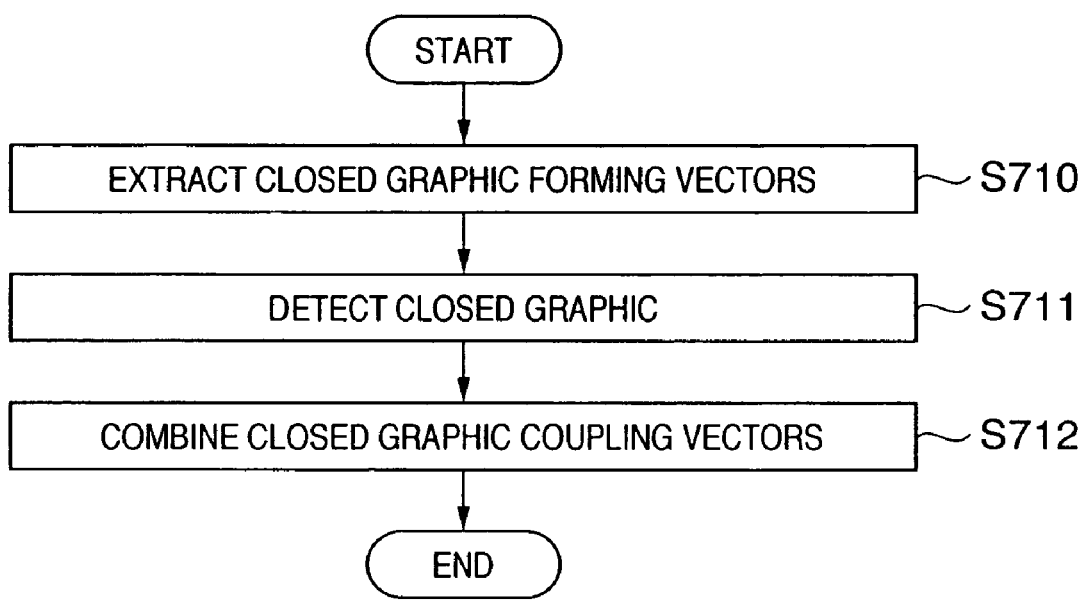
FIG. 14 is a flowchart for explaining the procedure for a process of detecting a graphic element.

FIG. 14 is a flowchart for explaining the procedure for a process of detecting a graphic element. Closed graphic forming vectors are extracted from vector data by excluding unwanted vectors, two ends of which are not coupled to other vectors (step S710). An initial point of a vector of interest of the closed graphic forming vectors is set as a start point, and vectors are traced clockwise in turn. This process is made until the start point is reached, and all passing vectors are grouped as a closed graphic that forms one graphic element (step S711). Also, all closed graphic forming vectors present in the closed graphic are grouped in this case. Furthermore, an initial point of a vector which is not grouped yet is set as a start point, and the above process is repeated. Finally, of the unwanted vectors excluded in step S710, those which join the vectors grouped as the closed graphic in step S711 are detected and are grouped as one graphic element (step S712).

With the above-mentioned process, a graphic block can be handled as an independently re-usable graphic object.

[Conversion Process into Application Data]

Figure 15:
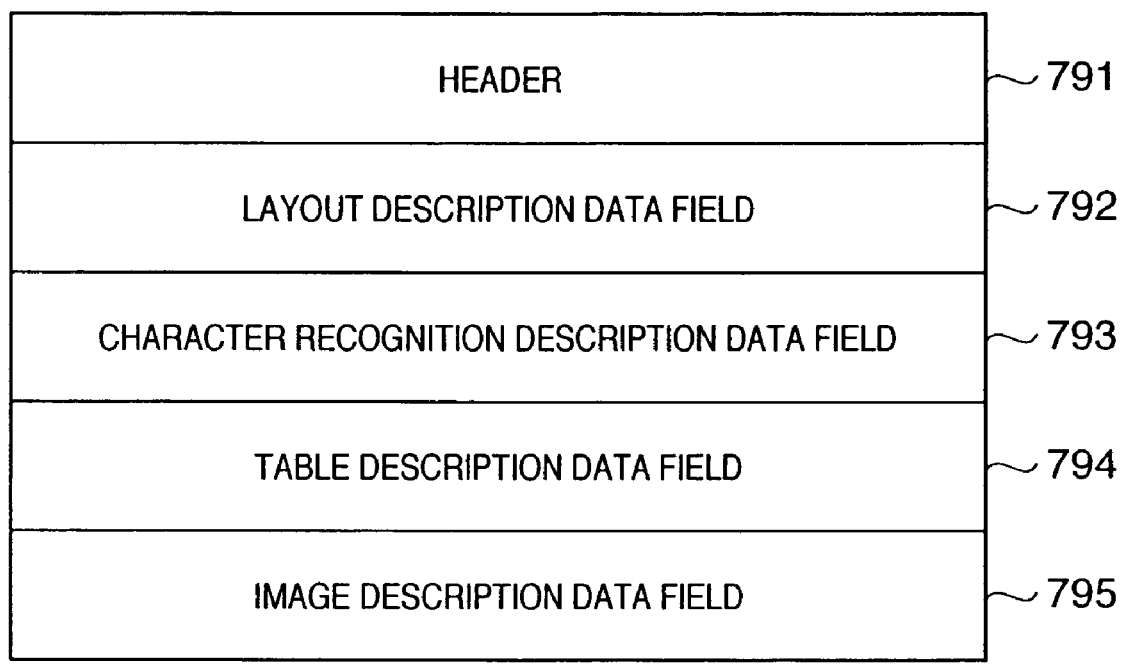
FIG. 15 is a view showing the data structure of a file in an intermediate data format obtained as a conversion result of the block selection process and vectorization process for image data of one page.

FIG. 15 is a view showing the data structure of a file in an intermediate data format obtained as the conversion result of the block selection process (step S1201) and vectorization process (step S1209) for image data of one page. The data format shown in FIG. 15 is called a document analysis output format (DAOF) hereinafter. That is, FIG. 15 shows the DAOF data structure.

Referring to FIG. 15, reference numeral 791 denotes a Header which holds information associated with document image data to be processed. Reference numeral 792 denotes a layout description data field which holds property information and block address information of respective blocks which are recognized for respective properties such as TEXT (text), TITLE (title), CAPTION (caption), LINEART (line art), PICTURE (natural image), FRAME (frame), TABLE (table), and the like.

Reference numeral 793 denotes a character recognition description data field which holds character recognition results obtained by executing character recognition of TEXT blocks such as TEXT, TITLE, CAPTION, and the like. Reference numeral 794 denotes a table description data field which stores details of the structure of TABLE blocks. Reference numeral 795 denotes an image description data field which stores image data of PICTURE blocks, LINEART blocks, and the like extracted from the document image data.

Such DAOF data itself is often saved as a file in place of intermediate data. However, in the state of a file, a general document creation application cannot re-use individual objects. Hence, a process of converting the DAOF data into application data (step S1210) will be described in detail below.

Figure 16:
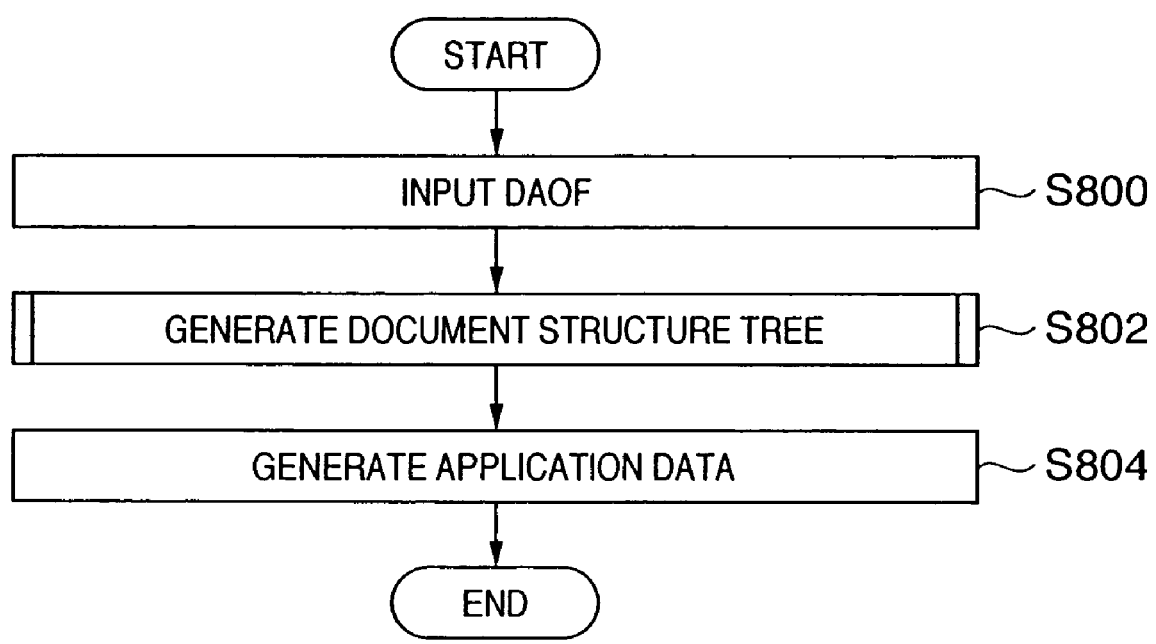
FIG. 16 is a flowchart for explaining the schematic procedure for the entire application data conversion process.

FIG. 16 is a flowchart for explaining the schematic procedure for the entire application data conversion process. DAOF data is input (step S800). A document structure tree which serves as a basis of application data is generated (step S802). Actual data in the DAOF are input based on the document structure tree, thus generating actual application data (step S804).

Figure 17:
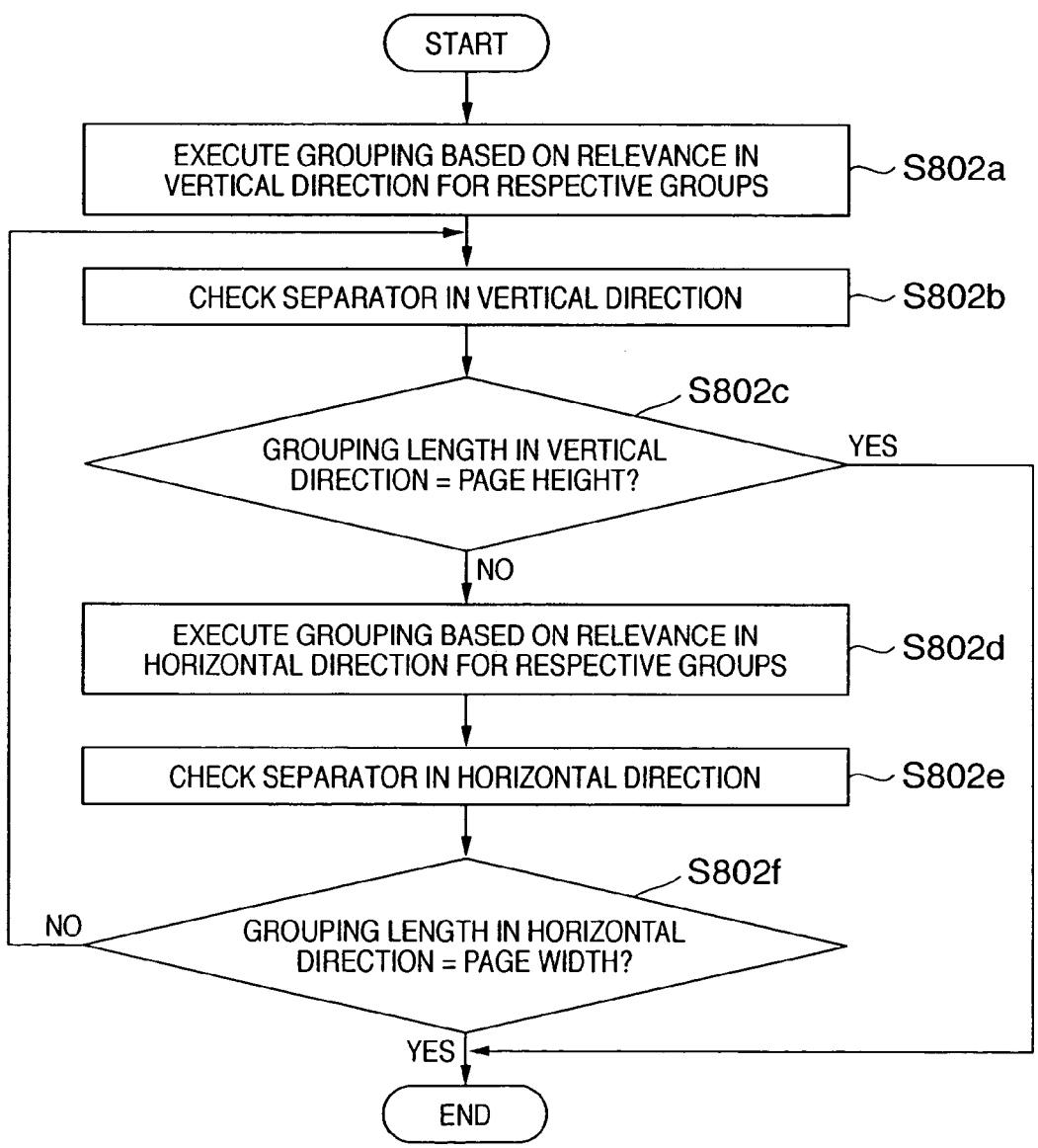
FIG. 17 is a flowchart for explaining the detailed procedure for a document structure tree generation process.
Figure 18A:
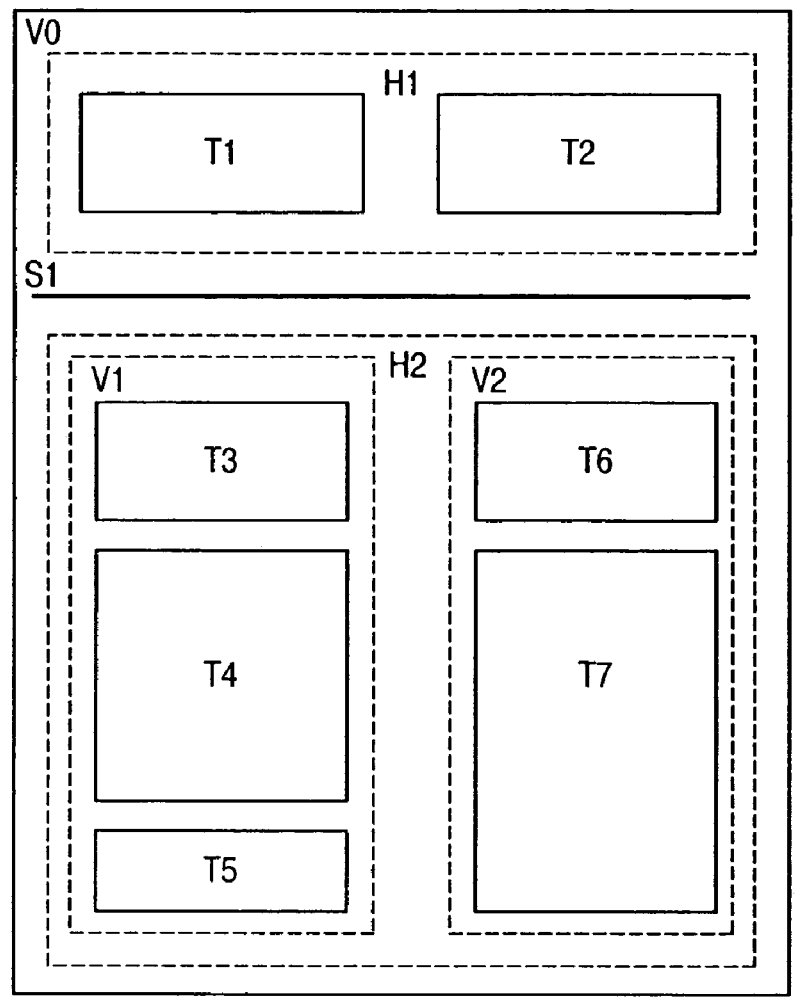
FIGS. 18A and 18B are views for explaining an overview of a document structure tree.
Figure 18B:
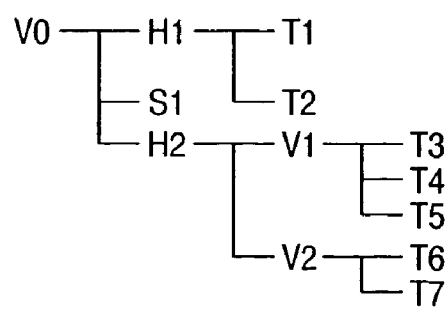

FIG. 17 is a flowchart for explaining the detailed procedure of a document structure tree generation process (step S802). FIGS. 18A and 18B are views for explaining an overview of a document structure tree. As a basic rule of the overall control, the flow of processes transits from a microblock (single block) to a macroblock (a set of blocks). In the following description, a block indicates a microblock and macroblock.

Re-grouping is done for respective blocks on the basis of relevance in the vertical direction (step S802a). Immediately after the flow starts, determination is made for respective microblocks. Note that relevance can be defined by checking if the distance between neighboring blocks is small, blocks have nearly the same block widths (heights in the case of the horizontal direction), and so forth. Information of the distances, widths, heights, and the like can be extracted with reference to the DAOF.

FIG. 18A shows an actual page configuration, and FIG. 18B shows a document structure tree of that page. As a result of grouping in step S802a, T3, T4, and T5 form one group V1, T6 and T7 form one group V2, and these groups are generated as those which belong to an identical layer.

The presence/absence of a vertical separator is checked (step S802b). Physically, a separator is an object which has a line property in the DAOF. Logically, a separator is an element which explicitly divides blocks in an application. Upon detection of a separator, a group is re-divided in the identical layer.

It is then determined using a group length whether no more divisions are present (step S802c). For example, it is determined whether the grouping length in the vertical direction agrees with a page height. If the group length in the vertical direction agrees with the page height (YES), the document structure tree generation process ends. For example, in the case of the structure shown in FIGS. 18A and 18B, groups V1 and V2 have no separator, and their group height does not agree with the page height. Hence, NO is determined in step S802c, and the flow advances to step S802d.

In step S802d, re-grouping is done for respective blocks on the basis of relevance in the horizontal direction. Note that the first determination immediately after the flow starts is made for respective microblocks in this re-grouping. Definitions of relevance and its determination information are the same as those in the vertical direction. For example, in the case of the structure shown in FIGS. 18A and 18B, T1 and T2 generate group H1, and V1 and V2 generate group H2. Groups H1 and H2 are generated as those which belong to an identical layer one level higher than V1 and V2.

The presence/absence of a separator in the horizontal direction is checked (step S802e). Since FIGS. 18A and 18B include separator S1, that separator is registered in a tree, thus generating layers H1, S1, and H2. It is determined using a group length whether no more divisions are present (step S802f). For example, it is determined whether the grouping length in the horizontal direction agrees with a page width. As a result, if the group length in the horizontal direction agrees with the page width (YES), the document structure tree generation process ends. On the other hand, if the group length in the horizontal direction does not agree with the page width (NO), the flow returns to step S802b to repeat the processes from relevance check in the vertical direction in an upper layer by one level. For example, in the case of the structure shown in FIGS. 18A and 18B, since the group length agrees with the page width, the process ends, and uppermost layer V0 that represents the entire page is finally appended to the document structure tree.

After the document structure tree is completed, application data is generated based on that information in step S804. A practical example in the case of the structure shown in FIGS. 18A and 18B will be explained below.

That is, since H1 includes two blocks T1 and T2 in the horizontal direction, it is output as two columns. After internal information of T1 (with reference to the DAOF, text as the character recognition result, image, and the like) is output, a new column is set, and internal information of T2 is output. After that, separator S1 is output. Since H2 includes two blocks V1 and V2 in the horizontal direction, it is output as two columns. Internal information of V1 is output in the order of T3, T4, and T5, and a new column is set. Then, internal information of V2 is output in the order of T6 and T7. In this manner, the conversion process into application data can be done.

[Appending of Pointer Information]

A pointer information appending process in step S136 will be described in detail below. When a document to be processed is specified by the search process, or when a source file is reproduced by vectorization, and that document is to undergo the recording process, pointer information is appended upon recording onto a paper sheet. As a result, source file data can be easily acquired when various processes are executed again using this document.

Figure 19:
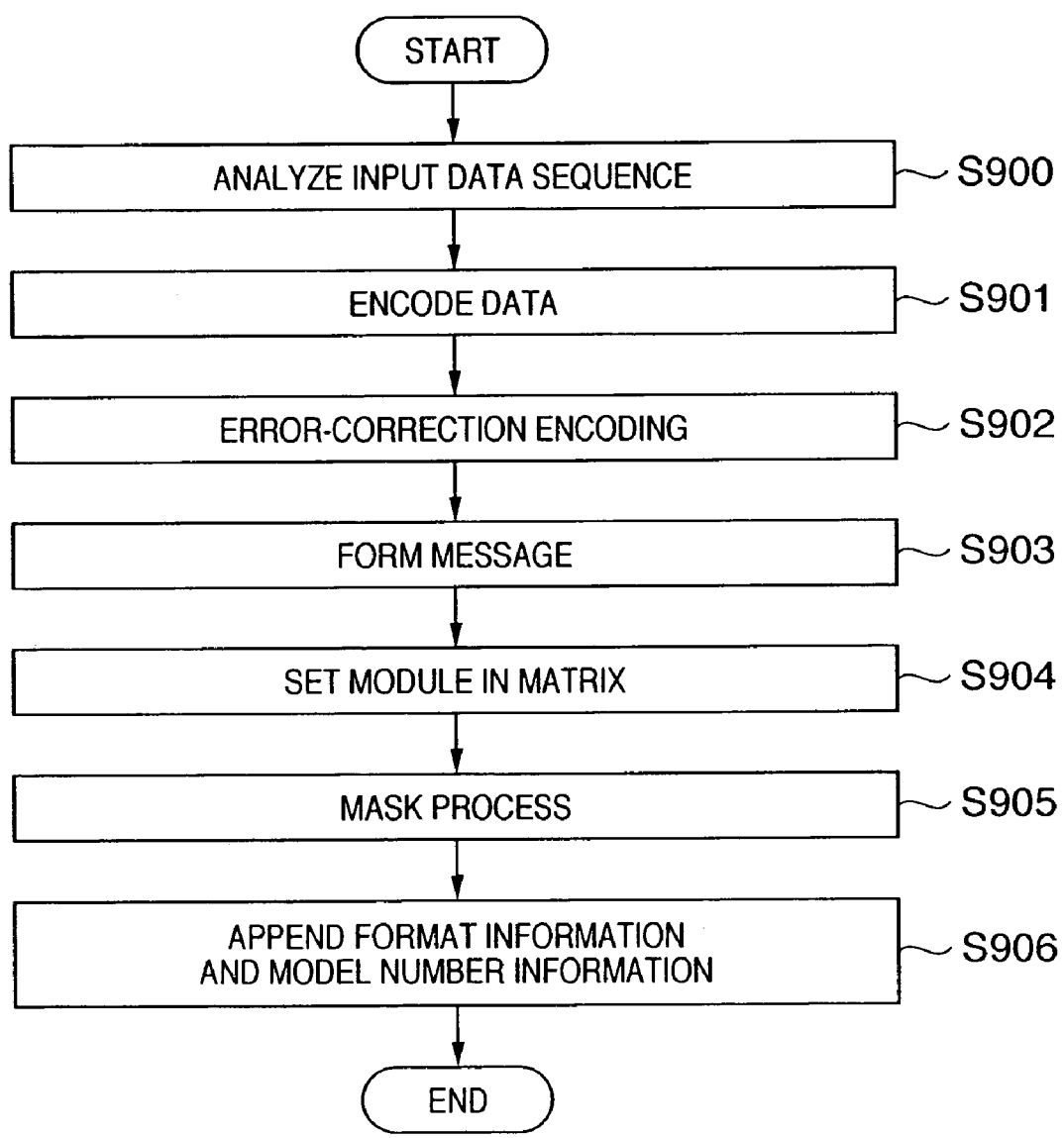
FIG. 19 is a flowchart for explaining the procedure for a process of encoding a data character string serving as pointer information using a two-dimensional barcode and appending it to an image.

FIG. 19 is a flowchart for explaining the procedure for a process of encoding a data character string as pointer information using a two-dimensional barcode (QR code symbol: JIS X0510) 311, and appending it to an image.

Data to be encoded in the two-dimensional barcode represents server address information where the corresponding file is stored, and is formed of, e.g., path information including a file server name. Or the server address information may be formed of a URL to the corresponding server, a ID used to manage the databases 105a and 105b or the storage device 111 of the MFP 100 itself which store the corresponding file, or the like.

In order to identify different types of characters to be encoded, an input data sequence is analyzed. Also, error detection and error correction levels are selected, and a minimum model number that can store input data is selected (step S900). The input data sequence is converted into a predetermined bit sequence, and an indicator indicating a mode (numeric, alphanumeric, 8-bit byte, kanji, etc.) and an end pattern are appended as needed. Furthermore, the bit sequence is converted into predetermined bit code words, thus encoding the data (step S901).

At this time, for the purpose of error correction, the code word sequence is segmented into a predetermined number of blocks in accordance with the model number and error correction level, and error correction code words are generated for respective blocks and are appended after the data code word sequence (step S902). Furthermore, the data code words of respective blocks obtained in step S902 are connected, and error correction code words and remainder code words as needed are connected after the data code word sequence to form a message (step S903).

Next, the code word module is set in a matrix together with a position detection pattern, separation pattern, timing pattern, alignment pattern, and the like (step S904). Furthermore, a mask pattern optimal to the symbol encoding region is selected, and is converted by calculating XORs with the module obtained in step S904 (step S905). Finally, type information and model number information are generated for the module obtained in step S905, thus completing a two-dimensional code symbol (step S906).

When an electronic file from, e.g., the client PC 102 is to be formed as print data, i.e., as a recorded image by the printing device 112, on a paper sheet, the two-dimensional barcode that incorporates server address information is converted into recordable raster data by the data processing device 115, and is appended to a predetermined position on raster data upon image formation. The user who received a paper sheet that has undergone image formation in this way scans that paper sheet by the image scanning unit 110, thus detecting the storage location of the server that stores an original electronic file from the pointer information in step S1203 above.

As a means for appending additional information for the same purpose, for example, a method of directly appending pointer information to a document as a character string, and so-called watermarking methods including a method of embedding information by modulating the spacings of a character string in a document (especially, the spacings between neighboring characters), a method of embedding information in a halftone image in a document, and the like, can be applied in addition to the two-dimensional barcode described in this embodiment.

As described above, according to this embodiment, image data obtained by scanning a document not only can be saved as image data but also can preferably be vectorized and held as re-usable and re-editable data. A reduction in sizes of data to be saved makes it possible to provide an image processing system, image processing apparatus, and image processing method which can efficiently search for them.

Second Embodiment

An embodiment that considers the file access right will be explained below. Our document files often include documents re-use of which by a third party is preferably limited. The above-mentioned embodiment has been explained under the condition that all files stored in the file server can be freely accessed, and the entire file or some objects of the file are re-usable. Hence, a case will be explained below wherein when an electronic file is searched for based on pointer information, the access right of the electronic file that is specified as a result of the search is limited.

Figure 20:
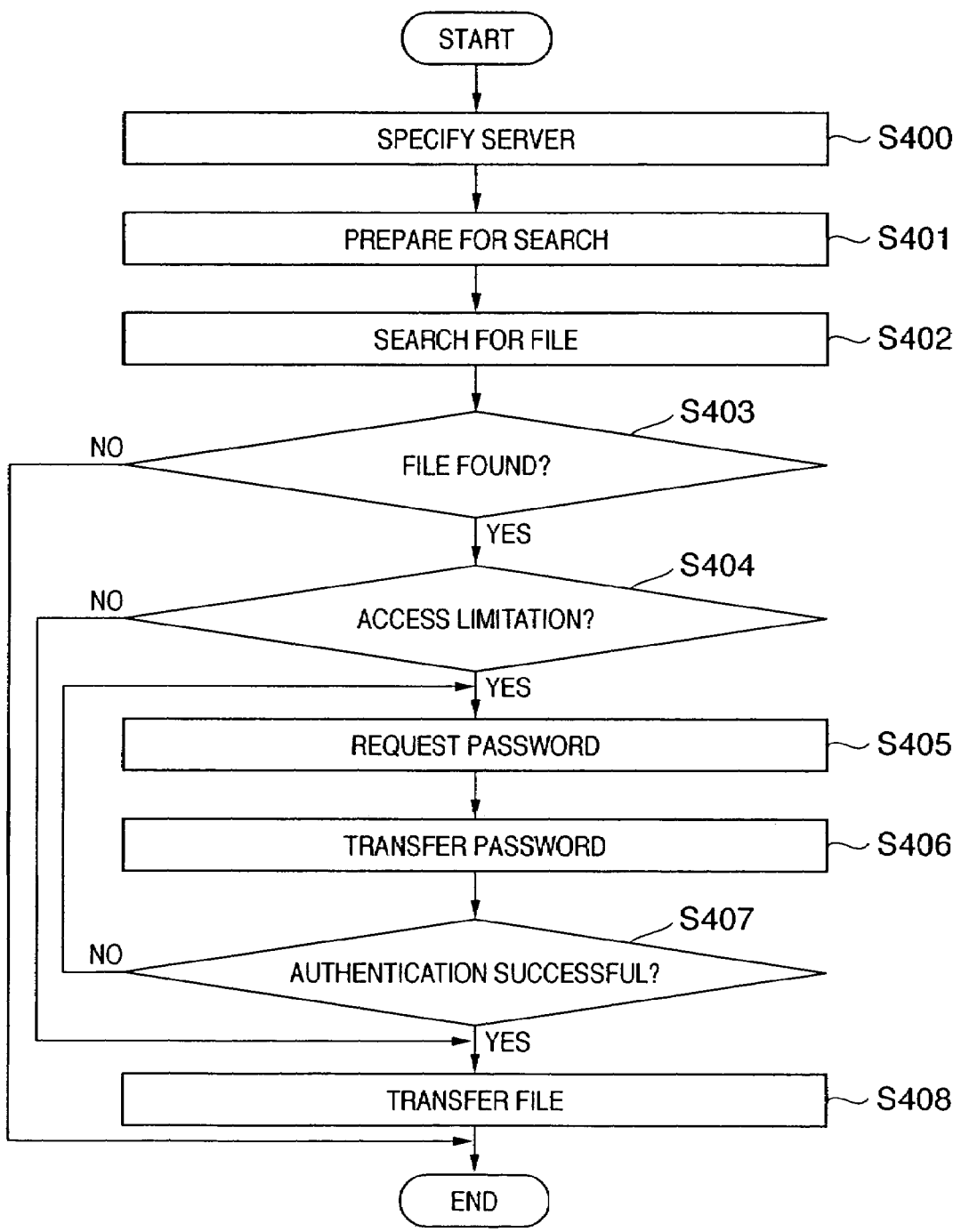
FIG. 20 is a flowchart for explaining the procedure for a process of searching a server which stores an electronic file on the basis of pointer information including a file access right.

FIG. 20 is a flowchart for explaining the procedure for a process of searching a server which stores an electronic file on the basis of pointer information including a file access right. Since steps S400 to S403 in FIG. 20 are the same as those in FIG. 9, a description thereof will be omitted. If an electronic file is specified in step S403 (YES), the file server checks access right information of that file (step S404). As a result, if the access right of that file is limited (YES), the file server requests the MFP 100 to transmit a password (step S405).

The MFP 100 prompts the operator to input a password, and transmits the input password to the file server (step S406). The file server collates the received password to make authentication (step S407). If authentication has succeeded (YES), the file server notifies the address of the electronic file, as has been explained with reference to FIG. 3, and transfers an electronic file to the MFP 100 if the process that the user wants is acquisition of image data (step S408).

Note that the authentication method for access right control is not limited to the method using the password in steps S405 and S406. For example, various other authentication means such as popular biological authentication (e.g., fingerprint authentication), authentication using a card, and the like can be adopted.

In this embodiment, a file is specified by pointer information additionally given to a paper document. The same control can be applied to a case wherein a file is specified by the search process in steps S1206 to S1208 in FIG. 3.

On the other hand, if the file cannot be specified from the file server in step S403, the vectorization process explained in step S1209 in FIG. 3 can be limited. That is, when a limitation of the access right to an original electronic file is detected from image data obtained by scanning a paper document, the vectorization process is executed only when authentication is successful, thus limiting use of documents with high secrecy.

Third Embodiment

In the above embodiments, as a means for specifying original file data held by the server from image information obtained by scanning a document image, either means for specifying a document based on pointer information appended to the document or means for searching for and specifying a corresponding electronic file on the basis of each object information described in the document is used, as shown in FIG. 3. By contrast, in order to specify an original electronic file more accurately, both the means may be used in combination.

That is, even when the presence of an original file can be detected based on pointer information obtained from a document image, a layout search process according to layout information or a full-text retrieval process based on a keyword obtained by character recognition is also applied to the detected file using object information in the document. An electronic file that can yield a high matching rate is formally specified as an original file. For example, even when the lower-bit part of pointer information is doubtful and cannot be corrected by error correction, a file can be specified by narrowing down the search range. Therefore, an electronic file can be quickly and accurately specified.

Fourth Embodiment

In the above embodiments, when the search process cannot specify an original file, the entire image information undergoes a vectorization process. By contrast, for example, in the case of a general document, not all objects in the document are newly created, and some objects may be diverted from other files. For example, a document creation application prepares some patterns of background objects (wallpapers), and the user normally selects and uses one of these patterns. Hence, such object is more likely to be present in other document files in the document file database as re-usable vector data.

Hence, as another embodiment of the vectorization process (step S1209) in FIG. 3, the database is searched for a file which includes an object which matches each of individual objects segmented by the block selection process. Vector data of the matched object is individually acquired from that file. As a result, the input document need not be fully vectorized but can be vectorized more quickly. Furthermore, deterioration of image quality due to the vectorization process applied to parts that do not require any vectorization process can be prevented.

On the other hand, if the search process (step S1206) in FIG. 3 can specify an original file as a PDF, that PDF often has, as an additional file, character codes obtained by already applying character recognition to text objects in that document. Upon vectorizing such PDF file, if the character code file is used, a character recognition process in the vectorization process in step S1209 and subsequent steps can be skipped. That is, the entire vectorization process can be done more quickly.

Fifth Embodiment

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to the present invention, upon obtaining data which allows re-use or re-editing of a document such as a paper document, character information having undergone outline conversion in the past can skip an outline conversion process. Thus, the processing efficiency can be increased.

The present invention is not limited to the above embodiments and various changes and modifications can be made within the spirit and scope of the present invention. Therefore, to apprise the public of the scope of the present invention the following claims are made.

CLAIM OF PRIORITY

This application claims priority from Japanese Patent Application No. 2003-390748 filed on Nov. 20, 2003, which is hereby incorporated by reference herein.

What is claimed is:

1. An image processing apparatus comprising:
input means for inputting image data;
character recognition means for sequentially recognizing pieces of character information included in the image data input by said input means;
outline conversion means for applying outline conversion to the pieces of character information included in the image data input by said input means, using vector data;
management means for managing a character type of the pieces of character information recognized by said character recognition means and the vector data having undergone outline conversion by said outline conversion means by associating the character type and the vector data with each other;
determination means for determining upon recognizing the pieces of character information by said character recognition means whether the character type of the pieces of character information has undergone previous outline conversion; and
control means for, if said determination means determines that the character type has undergone the previous outline conversion, controlling said management means to execute management using vector data used in the previous outline conversion.

2. The apparatus according to claim 1, wherein said input means inputs image data obtained by scanning a document.

3. The apparatus according to claim 1, wherein
said management means executes management by associating information that pertains to a character color with the vector data, and
said determination means makes a determination on the basis of not the character color but whether the character type is identical to one having undergone the previous outline conversion.

4. The apparatus according to claim 1, wherein
said management means manages information that pertains to a character size by associating the information with the vector data, and
said determination means makes a determination on the basis of not the character size but whether the character type is identical to one having undergone the previous outline conversion.

5. The apparatus according to claim 1, further comprising conversion means for converting information managed by said management means into a format that can be handled by predetermined document creation software.

6. The apparatus according to claim 5, wherein said conversion means segments the image data input by said input means into a plurality of objects in accordance with properties of the objects and independently applies a process to each object.

7. The apparatus according to claim 6, wherein said conversion means applies, to each of the plurality of objects, at least one of outline conversion by said outline conversion means, conversion of a line art object into vector data, and conversion of an image object into a predetermined image format.

8. An image processing method comprising:
an input step of inputting image data;
a character recognition step of sequentially recognizing pieces of character information included in the image data input in the input step;
an outline conversion step of applying outline conversion to the pieces of character information included in the image data input in the input step, using vector data;
a management step of managing a character type of the pieces of character information recognized in the character recognition step and the vector data having undergone outline conversion in the outline conversion step by associating the character type and the vector data with each other;
a determination step of determining upon recognizing the pieces of character information in the character recognition step whether the character type of the pieces of character information has undergone previous outline conversion; and a control step of, if it is determined in the determination step that the character type has undergone the previous outline conversion, controlling to execute management in the management step using vector data used in the previous outline conversion.

9. A computer readable medium storing a computer program for causing a computer to execute:

an input procedure for inputting image data;

a character recognition procedure for sequentially recognizing pieces of character information included in the image data input in the input procedure;

an outline conversion procedure for applying outline conversion to the pieces of character information included in the image data input in the input procedure using vector data;

a management procedure for managing a character type of the pieces of character information recognized in the character recognition procedure and the vector data having undergone outline conversion in the outline conversion procedure by associating the character type and the vector data with each other;

a determination procedure for determining upon recognizing the pieces of character information in the character recognition procedure whether the character type of the pieces of character information has undergone previous outline conversion; and a control procedure for, if it is determined in the determination procedure that the character type has undergone the previous outline conversion, controlling to execute management in the management procedure using vector data used in the previous outline conversion.

* * * * *